United States Patent
Schöller et al.

(10) Patent No.: US 10,633,610 B2
(45) Date of Patent: Apr. 28, 2020

(54) COMB POLYMERS FOR IMPROVING NOACK EVAPORATION LOSS OF ENGINE OIL FORMULATIONS

(71) Applicant: Evonik Operations GmbH, Essen (DE)

(72) Inventors: Katrin Schöller, Darmstadt (DE); Stefan Maier, Mainz (DE); Sarah Lippert, Darmstadt (DE); Klaus Schimossek, Bensheim (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 16/325,955

(22) PCT Filed: Aug. 28, 2017

(86) PCT No.: PCT/EP2017/071498
§ 371 (c)(1),
(2) Date: Feb. 15, 2019

(87) PCT Pub. No.: WO2018/041755
PCT Pub. Date: Mar. 8, 2018

(65) Prior Publication Data
US 2019/0203148 A1    Jul. 4, 2019

(30) Foreign Application Priority Data

Aug. 31, 2016 (EP) ..................... 16186495

(51) Int. Cl.
*C10M 145/14* (2006.01)
*C08F 290/04* (2006.01)
*C08F 290/12* (2006.01)
*C10M 105/36* (2006.01)
*C10M 169/04* (2006.01)

(52) U.S. Cl.
CPC ....... *C10M 145/14* (2013.01); *C08F 290/048* (2013.01); *C08F 290/128* (2013.01); *C10M 105/36* (2013.01); *C10M 169/041* (2013.01); *C10M 2203/003* (2013.01); *C10M 2203/1025* (2013.01); *C10M 2205/173* (2013.01); *C10M 2207/2825* (2013.01); *C10M 2209/084* (2013.01); *C10N 2220/021* (2013.01); *C10N 2220/025* (2013.01); *C10N 2220/028* (2013.01); *C10N 2220/033* (2013.01); *C10N 2220/13* (2013.01); *C10N 2230/02* (2013.01); *C10N 2230/08* (2013.01); *C10N 2230/68* (2013.01); *C10N 2230/74* (2013.01); *C10N 2240/10* (2013.01); *C10N 2270/00* (2013.01)

(58) Field of Classification Search
CPC ............ C10M 145/14; C10M 169/041; C10M 105/36; C10M 2203/003; C10M 2205/173; C10M 2203/1025; C10M 2209/084; C10M 2207/2825; C08F 290/128; C08F 290/048; C10N 2220/13; C10N 2270/00; C10N 2240/10; C10N 2230/74; C10N 2230/68; C10N 2230/08; C10N 2230/02; C10N 2220/033; C10N 2220/028; C10N 2220/025; C10N 2220/021

See application file for complete search history.

(56) References Cited

U.S. PATENT DOCUMENTS

| | | |
|---|---|---|
| 3,772,196 A | 11/1973 | St. Clair et al. |
| 4,116,917 A | 9/1978 | Eckert |
| 4,788,316 A | 11/1988 | Thornthwaite et al. |
| 5,565,130 A | 10/1996 | Omeis et al. |
| 5,597,871 A | 1/1997 | Auschra et al. |
| 8,067,349 B2 | 11/2011 | Stoehr et al. |
| 2003/0195128 A1* | 10/2003 | Deckman ............ C10M 111/04 508/591 |
| 2008/0194443 A1 | 8/2008 | Stoehr et al. |
| 2010/0190671 A1 | 7/2010 | Stoehr et al. |
| 2011/0306533 A1 | 12/2011 | Eisenberg et al. |
| 2011/0319305 A1 | 12/2011 | Eisenberg et al. |
| 2013/0196888 A1 | 8/2013 | Truong-Dinh |
| 2016/0097017 A1 | 4/2016 | Eisenberg et al. |

FOREIGN PATENT DOCUMENTS

| | | | |
|---|---|---|---|
| DE | 102007046223 A1 * | 4/2009 | ............ C08F 255/00 |
| DE | 10 2009 001 447 | 9/2010 | |
| EP | 0 621 293 | 10/1994 | |
| GB | 2 270 317 | 3/1994 | |
| WO | 2007/003238 | 1/2007 | |
| WO | 2009/007147 | 1/2009 | |
| WO | 2010/102903 | 9/2010 | |
| WO | 2012/025901 | 3/2012 | |
| WO | 2014/170169 | 10/2014 | |

OTHER PUBLICATIONS

International Search Report issued in PCT/EP2017/071498, dated Nov. 15, 2017 (3 pp.).
Written Opinion issued in PCT/EP2017/071498, dated Nov. 15, 2017 (6 pp.).

* cited by examiner

*Primary Examiner* — Taiwo Oladapo

(74) *Attorney, Agent, or Firm* — Grüneberg and Myers PLLC

(57) ABSTRACT

A comb polymer can be used for reducing a Noack evaporation loss of a lubricant composition, especially of an engine oil composition. Application of the comb polymer to the lubricant composition can bring about the desired reduction. The comb polymer can include specified amounts of macromonomer and alkyl acrylates. Resulting lubricant compositions can include the comb polymer.

19 Claims, No Drawings

US 10,633,610 B2

COMB POLYMERS FOR IMPROVING NOACK EVAPORATION LOSS OF ENGINE OIL FORMULATIONS

This application is a National Stage entry under § 371 of International Application No. PCT/EP2017/071498, filed on Aug. 28, 2017, and which claims the benefit of EP Application No. 16186495.4, filed on Aug. 31, 2016.

The present invention is directed to selected comb polymers comprising specified amounts of macromonomer and alkyl acrylates, their preparation, lubricant compositions comprising such comb polymers and their use for reducing Noack evaporation losses of lubricant compositions, especially of engine oil (EO) compositions.

Evaporation losses in lubricant oils are an important topic not only because of their significance on environmental topics, but also because of their impact on lubricant performance and formulation regulations. In many applications the loss of lubricant due to evaporation can be significant. At elevated temperatures oils then become more viscous because of evaporation. Volatile components of the lubricant may be lost through evaporation, resulting in a significant increase in viscosity and a further temperature rise due to higher friction, which in turn causes further oil losses due to evaporation. Volatility of lubricants is expressed as a direct measure of evaporation losses, for example measured by the Noack method (G. W. Stachowiak, A. W. Batchelor, Engineering Tribology, 4th Edition, p. 37-38, 2013).

Over the years, various research was done on a correlation of lubricant volatility to engine emissions and oil consumption. It is therefore known that reducing lubricant volatility should have a positive impact on both of these important engine performance characteristics. For this reason lubricant volatility has become and will continue to be an important specification in modern engine oils (de Paz, E. and Sneyd, C., "The Thermogravimetric Noack Test: A Precise, Safe and Fast Method for Measuring Lubricant Volatility," SAE Technical Paper 962035, 1996).

The contribution of engine oil evaporation to oil consumption was studied in detail as it is an important source of hydrocarbon and particulate emissions in automotive engines. Another negative effect caused by oil consumption in engines is the increase in oil viscosity which in turn results in decreased oil circulation and lower fuel economy. Oil consumption in engines is directly related to physical oil properties such as engine oil volatility and viscosity. The volatility directly governs the oil evaporation rate from hot surfaces during the engine cycle. Oil evaporating from the piston-ring-liner-system is believed to contribute significantly to total oil consumption (Yilmaz, E., Tian, T., Wong, V., and Heywood, J., "An Experimental and Theoretical Study of the Contribution of Oil Evaporation to Oil Consumption," SAE Technical Paper 2002-01-2684, 2002).

This shows the importance of engine oil volatility on modern engine oil performance. As a result, one specification in engine oil formulations established by the Society of Automotive Engineers (SAE), SAE J300, is the definition of a maximum Noack evaporation loss of the formulation (Engine Oil Viscosity Classification, J300_201501, Fuels and Lubricants Tc 1 Engine Lubrications, SAE International, 2015).

Noack is a frequently used method to measure lubricant volatility. Lubricant manufacturers and users recognize that the operating conditions of the Noack methods are representative of those experienced by oils in engines. The Noack volatility of an oil is the weight lost by the oil when it is heated at 250° C. for 1 hour under a constant air flow. This test, like the engine, constantly exposes the oil to air and the test temperature is comparable to those around the top piston rings of engines. The piston ring area may be the main pathway by which oil volatility impacts emissions and oil consumption. This is due in part to the high temperatures, but it is also the result of the lubricant's close proximity to the combustion chamber and its exhaust valves (de Paz, E. and Sneyd, C., "The Thermogravimetric Noack Test: A Precise, Safe and Fast Method for Measuring Lubricant Volatility," SAE Technical Paper 962035, 1996).

In summary, it is very important to minimize the evaporative loss or Noack of lubricants, especially of lubricants for engines, in order to avoid oil consumption effects like reduced oil circulation and decreased fuel economy and environmentally problematic emissions.

Evaporation loss in lubricant applications is attributed to the properties of the base oil used in a lubricating composition. Depending on the base oils different Noack values are obtained. It was found that by using ester oils with less volatile components in the lubricant, typically lower Noack values were obtained (Horner, D. (2002), Recent trends in environmentally friendly lubricants. J. Synthetic Lubrication, 18: 327-347).

This literature shows that today it is believed that the evaporation loss of the base oil components influence the Noack values. In contrast, there is very little known about the contribution solid additives might have on evaporation loss. There are only very few publications describing the influence of additives on the evaporative loss in lubricant oils. Bartz (Bartz, W. J. (2000), Influence of viscosity index improver, molecular weight, and base oil on thickening, shear stability, and evaporation losses of multigrade oils. Lubrication Science, 12: 215-237), for example, describes the influence of the additive amount on evaporative loss, but could not detect a systematic correlation or big influence.

In general, it is believed today that evaporative losses in lubricants are attributed to the base oils. Typically, in an engine oil formulation the base oil is selected having the lowest volatility obtainable at the necessary volatility level (Coon, J. and Loeffler, D., "Routes of crankcase oil loss," SAE Technical Paper 590009, 1959).

However, changing the base oil mixture in a lubricating composition to improve the Noack evaporation loss has limitations, because the criteria how base oils are selected are manifold and other parameters like viscometric performance, sulfur content, aromatic content or availability as well as price play an important role.

Until now it was not possible to reduce the Noack to a minimum value by just optimizing the base oil mixture. But as Noack becomes more and more important with lower engine oil grades (like 0W8), a solution for improving Noack has to be found.

Noack is defined as a method to measure evaporation loss of fully formulated engine oils. By measuring the evaporation loss of single components like viscosity index (VI) improvers, it was now surprisingly found that there is a significant contribution to evaporation loss by the single components in addition to the base oil mix used in the lubricant. More specifically, it was found that certain types of VI improvers significantly contribute to the Noack evaporation loss. This is unexpected as VI improvers mainly consist of oil (which is needed for the handling of the VI improver and of which it is known to be a source of evaporation loss) and a solid polymer (which should not contribute to the Noack evaporation loss).

It was now surprisingly found that polyalkyl(meth)acrylate based comb polymers comprising a small amount of alkyl acrylates can contribute to a low Noack evaporation loss of a lubricating composition.

The comb polymer technology in general and their use as viscosity index improver is already known (US 2008/0194443, US 2010/0190671 and WO 2014/170169), although the effect of the polymer comprising acrylates as comonomers in combination with low Noack of combs in lubricating formulations has never been described.

Lubricant properties are typically improved by the addition of additives to lubricating oils.

U.S. Pat. Nos. 5,565,130 and 5,597,871, for example, disclose using comb polymers comprising polybutadiene-derived macromonomers as viscosity index improvers. However, no effect on the Noack volatility is disclosed therein.

WO 2007/003238 A1 describes oil-soluble comb polymers based on polyolefin-based macromonomers, especially polybutadiene-based methacrylic esters, and C1-C10 alkyl methacrylates. The comb polymers can be used as an additive for lubricant oils, in order to improve the viscosity index and shear stability. However, no effect on the Noack volatility is disclosed therein.

WO 2009/007147 A1 discloses the use of comb polymers based on polyolefin-based macromonomers, especially polybutadiene-based methacrylic esters, and C1-C10 alkyl methacrylates for improving the fuel consumption of motor vehicles. However, no effect on the Noack volatility is disclosed therein.

WO 2010/102903 A1 discloses the use of comb polymers as antifatigue additives for transmission, motor and hydraulic oils. However, no effect on the Noack volatility is disclosed therein.

DE 10 2009 001 447 A1 describes the use of comb polymers for improving the load-bearing capacity of hydraulic oils having a high viscosity index. However, no effect on the Noack volatility is disclosed therein.

WO 2012/025901 A1 (Total) discloses the use of comb polymers in lubricants in combination with particular friction modifiers. However, no effect on the Noack volatility is disclosed therein.

Since the properties of the lubricants disclosed in the prior art are still unsatisfactory in relation to an improvement of the Noack volatility, it is the aim of the present invention to provide single components which contribute significantly to evaporation loss when added to a base oil used in a lubricating composition.

It was surprisingly found that comb polymers comprising a small amount of esters of (meth)acrylic acid and a hydroxylated hydrogenated polybutadiene and a small amount of alkyl acrylates have a positive impact on the Noack volatility of a lubricating composition.

DESCRIPTION OF THE INVENTION

A first object of the present invention is therefore directed to polyalkyl(meth)acrylate based comb polymers, comprising the following monomers:
  (a) 10 to 25% by weight of esters of (meth)acrylic acid and a hydroxylated hydrogenated polybutadiene; and
  (b) 0.5% to 11% by weight, preferably 0.5 to 5% by weight, of $C_{4-18}$ alkyl acrylates.

A preferred first embodiment is directed to the polyalkyl(meth)acrylate based comb polymers, comprising the following monomers:
  (a) 10 to 25% by weight of an ester of (meth)acrylic acid and a hydroxylated hydrogenated polybutadiene;
  (b) 0.5% to 11% by weight, preferably 0.5 to 5% by weight, of $C_{4-18}$ alkyl acrylates;
  (c) 0% to 1% by weight of methyl methacrylate;
  (d) 55% to 70% by weight of n-butyl methacrylate;
  (e) 5% to 20% by weight of $C_{10-30}$ alkyl (meth)acrylates, preferably $C_{10-15}$ alkyl methacrylates, more preferably $C_{12-14}$ alkyl methacrylates; and
  (f) 0% to 2% by weight of styrene monomers.

A further preferred first embodiment is directed to the polyalkyl(meth)acrylate based comb polymers, comprising the following monomers:
  (a) 13 to 23% by weight of an ester of (meth)acrylic acid and a hydroxylated hydrogenated polybutadiene;
  (b) 0.5% to 11% by weight, preferably 0.5 to 5% by weight, of $C_{4-18}$ alkyl acrylates;
  (c) 0.1% to 0.3% by weight of methyl methacrylate;
  (d) 55% to 70% by weight of n-butyl methacrylate;
  (e) 5% to 18% by weight of $C_{10-15}$ alkyl methacrylates, preferably $C_{12-14}$ alkyl methacrylates; and
  (f) 0.1% to 2% by weight of styrene monomers.

A further preferred first embodiment is directed to the polyalkyl(meth)acrylate based comb polymers, comprising the following monomers:
  (a) 13 to 14% by weight of an ester of (meth)acrylic acid and a hydroxylated hydrogenated polybutadiene;
  (b) 0.5% to 5% by weight of $C_{4-18}$ alkyl acrylates;
  (c) 0.1% to 0.3% by weight of methyl methacrylate;
  (d) 63% to 70% by weight of n-butyl methacrylate;
  (e) 13% to 18% by weight of $C_{10-15}$ alkyl methacrylates, preferably $C_{12-14}$ alkyl methacrylates; and
  (f) 0.1% to 0.3% by weight of styrene monomers.

A further preferred first embodiment is directed to the polyalkyl(meth)acrylate based comb polymers, comprising the following monomers:
  (a) 13 to 14% by weight of an ester of (meth)acrylic acid and a hydroxylated hydrogenated polybutadiene;
  (b) 0.5% to 5% by weight of $C_{4-18}$ alkyl acrylates;
  (c) 0.1% to 0.3% by weight of methyl methacrylate;
  (d) 66% to 70% by weight of n-butyl methacrylate;
  (e) 16% to 18% by weight of $C_{10-15}$ alkyl methacrylates, preferably $C_{12-14}$ alkyl methacrylates; and
  (f) 0.1% to 0.3% by weight of styrene monomers.

The content of each component (a), (b), (c), (d), (e) and (f) is based on the total composition of the polyalkyl(meth)acrylate based comb polymer. In a particular embodiment, the proportions of components (a), (b), (c), (d), (e) and (f) add up to 100% by weight.

The weight-average molecular weight $M_w$ of the polyalkyl(meth)acrylate based comb polymers according to the present invention is preferably in the range from 200.000 to 800.000 g/mol, and more preferably from 300.000 to 600.000 g/mol.

Preferably, the polyalkyl(meth)acrylate based comb polymers according to the present invention have a polydipersity index (PDI) $M_w/M_n$ in the range of 1 to 6, more preferably in the range of from 3 to 5.

$M_w$ and $M_n$ are determined by size exclusion chromatography (SEC) using commercially available polymethylmethacrylate standards. The determination is effected by gel permeation chromatography with THF as eluent.

A comb polymer in the context of this invention comprises a first polymer, which is also referred to as backbone or main chain, and a multitude of further polymers which are referred to as side chains and are bonded covalently to the backbone. In the present case, the backbone of the comb polymer is formed by the interlinked unsaturated groups of the mentioned (meth)acrylates. The ester groups of the (meth)acrylic esters, the phenyl radicals of the styrene monomers and the substituents of the further free-radically polymerizable comonomers form the side chains of the comb polymer.

The term "acrylate" refers to esters of acrylic acid; the term "methacrylate" refers to esters of methacrylic acid; and the term "(meth)acrylate" refers to both, esters of acrylic acid and esters methacrylic acid.

The $C_{4-18}$ alkyl acrylates for use in accordance with the invention are esters of acrylic acid and alcohols having 4 to 18 carbon atoms. The term "$C_{4-18}$ alkyl acrylates" encompasses individual acrylic esters with an alcohol of a particular length, and likewise mixtures of acrylic esters with alcohols of different lengths.

The suitable $C_{4-18}$ alkyl acrylates include, for example, butyl acrylate, pentyl acrylate, hexyl acrylate, 2-ethylhexyl acrylate, heptyl acrylate, 2-tert-butylheptyl acrylate, octyl acrylate, 3-isopropylheptyl acrylate, nonyl acrylate, decyl acrylate, undecyl acrylate, 5-methylundecyl acrylate, dodecyl acrylate, 2-methyldodecyl acrylate, tridecyl acrylate, 5-methyltridecyl acrylate, tetradecyl acrylate, pentadecyl acrylate, hexadecyl acrylate, 2-methylhexadecyl acrylate, heptadecyl acrylate and/or octadecyl acrylate.

Particularly preferred $C_{4-18}$ alkyl acrylates are butyl acrylate and acrylic esters of a linear $C_{16-18}$ alcohol mixture ($C_{16-18}$ alkyl acrylate).

The $C_{10-30}$ alkyl (meth)acrylates for use in accordance with the invention are esters of (meth)acrylic acid and straight chain or branched alcohols having 10 to 30 carbon atoms. The term "$C_{10-30}$ alkyl methacrylates" encompasses individual (meth)acrylic esters with an alcohol of a particular length, and likewise mixtures of (meth)acrylic esters with alcohols of different lengths.

Suitable $C_{10-30}$ alkyl (meth)acrylates include, for example, 2-butyloctyl (meth)acrylate, 2-hexyloctyl (meth)acrylate, decyl (meth)acrylate, 2-butyldecyl (meth)acrylate, 2-hexyldecyl (meth)acrylate, 2-octyldecyl (meth)acrylate, undecyl (meth)acrylate, 5-methylundecyl (meth)acrylate, dodecyl (meth)acrylate, 2-methyldodecyl (meth)acrylate, 2-hexyldodecyl (meth)acrylate, 2-octyldodecyl (meth)acrylate, tridecyl (meth)acrylate, 5-methyltridecyl (meth)acrylate, tetradecyl (meth)acrylate, 2-decyltetradecyl (meth)acrylate, pentadecyl (meth)acrylate, hexadecyl (meth)acrylate, 2-methylhexadecyl (meth)acrylate, 2-dodecylhexadecyl (meth)acrylate, heptadecyl (meth)acrylate, 5-isopropylheptadecyl (meth)acrylate, 4-tert-butyloctadecyl (meth)acrylate, 5-ethyloctadecyl (meth)acrylate, 3-isopropyloctadecyl (meth)acrylate, octadecyl (meth)acrylate, 2-decyloctadecyl (meth)acrylate, 2-tetradecyloctadecyl (meth)acrylate, nonadecyl (meth)acrylate, eicosyl (meth)acrylate, cetyleicosyl (meth)acrylate, stearyleicosyl (meth)acrylate, docosyl (meth)acrylate and/or eicosyltetratriacontyl (meth)acrylate. 2-decyl-tetradecyl (meth)acrylate, 2-decyloctadecyl (meth)acrylate, 2-dodecyl-1-hexadecyl (meth)acrylate, 1,2-octyl-1-dodecyl (meth)acrylate, 2-tetradecylocadecyl (meth)acrylate, 1,2-tetradecyl-octadecyl (meth)acrylate and 2-hexadecyl-eicosyl (meth)acrylate.

The $C_{10-15}$ alkyl methacrylates for use in accordance with the invention are esters of methacrylic acid and alcohols having 10 to 15 carbon atoms. The term "$C_{10-15}$ alkyl methacrylates" encompasses individual methacrylic esters with an alcohol of a particular length, and likewise mixtures of methacrylic esters with alcohols of different lengths.

The suitable $C_{10-15}$ alkyl methacrylates include, for example, decyl methacrylate, undecyl methacrylate, 5-methylundecyl methacrylate, dodecyl methacrylate, 2-methyldodecyl methacrylate, tridecyl methacrylate, 5-methyltridecyl methacrylate, tetradecyl methacrylate and/or pentadecyl methacrylate.

Particularly preferred $C_{10-15}$ alkyl methacrylates are methacrylic esters of a linear $C_{12-14}$ alcohol mixture ($C_{12-14}$ alkyl methacrylate).

The hydroxylated hydrogenated polybutadiene for use in accordance with the invention has a number-average molar mass $M_n$ of 4.000 to 6.000 g/mol, preferably 4.000 to 5.000 g/mol. Because of their high molar mass, the hydroxylated hydrogenated polybutadienes can also be referred to as macroalcohols in the context of this invention.

The number-average molar mass $M_n$ is determined by size exclusion chromatography using commercially available polybutadiene standards. The determination is effected to DIN 55672-1 by gel permeation chromatography with THF as eluent.

Preferably, the hydroxylated hydrogenated polybutadiene has a hydrogenation level of at least 99%. An alternative measure of the hydrogenation level which can be determined on the copolymer of the invention is the iodine number. The iodine number refers to the number of grams of iodine which can be added onto 100 g of copolymer. Preferably, the copolymer of the invention has an iodine number of not more than 5 g of iodine per 100 g of copolymer. The iodine number is determined by the Wijs method according to DIN 53241-1:1995-05.

Preferred hydroxylated hydrogenated polybutadienes can be obtained according to GB 2270317.

Some hydroxylated hydrogenated polybutadienes are also commercially available. The commercially hydroxylated hydrogenated polybutadienes include, for example, Kraton Liquid® L-1203, a hydrogenated polybutadiene OH-functionalized to an extent of about 98% by weight (also called olefin copolymer OCP) having about 50% each of 1,2 repeat units and 1,4 repeat units, of $M_n$=4200 g/mol, from Kraton Polymers GmbH (Eschborn, Germany). A further supplier of suitable alcohols based on hydrogenated polybutadiene is Cray Valley (Paris), a daughter company of Total (Paris), or the Sartomer Company (Exton, Pa., USA).

Preference is given to monohydroxylated hydrogenated polybutadienes. More preferably, the hydroxylated hydrogenated polybutadiene is a hydroxyethyl- or hydroxypropyl-terminated hydrogenated polybutadiene. Particular preference is given to hydroxypropyl-terminated polybutadienes.

These monohydroxylated hydrogenated polybutadienes can be prepared by first converting butadiene monomers by anionic polymerization to polybutadiene. Subsequently, by reaction of the polybutadiene monomers with ethylene oxide or propylene oxide, a hydroxy-functionalized polybutadiene can be prepared. This hydroxylated polybutadiene can be hydrogenated in the presence of a suitable transition metal catalyst.

The esters of (meth)acrylic acid for use in accordance with the invention and a hydroxylated hydrogenated polybutadiene described are also referred to as macromonomers in the context of this invention because of their high molar mass.

The macromonomers for use in accordance with the invention can be prepared by transesterification of alkyl (meth)acrylates. Reaction of the alkyl (meth)acrylate with the hydroxylated hydrogenated polybutadiene forms the ester of the invention. Preference is given to using methyl (meth)acrylate or ethyl (meth)acrylate as reactant.

This transesterification is widely known. For example, it is possible for this purpose to use a heterogeneous catalyst system, such as lithium hydroxide/calcium oxide mixture (LiOH/CaO), pure lithium hydroxide (LiOH), lithium methoxide (LiOMe) or sodium methoxide (NaOMe) or a homogeneous catalyst system such as isopropyl titanate (Ti(OiPr)$_4$) or dioctyltin oxide (Sn(OCt)$_2$O). The reaction is an equilibrium reaction. Therefore, the low molecular weight alcohol released is typically removed, for example by distillation.

In addition, the macromonomers can be obtained by a direct esterification proceeding, for example, from (meth) acrylic acid or (meth)acrylic anhydride, preferably under acidic catalysis by p-toluenesulfonic acid or methanesulfonic acid, or from free methacrylic acid by the DCC method (dicyclohexylcarbodiimide).

Furthermore, the present hydroxylated hydrogenated polybutadiene can be converted to an ester by reaction with an acid chloride such as (meth)acryloyl chloride.

Preferably, in the above-detailed preparations of the esters of the invention, polymerization inhibitors are used, for example the 4-hydroxy-2,2,6,6-tetramethylpiperidinooxyl radical and/or hydroquinone monomethyl ether.

Some of the macromonomers for use in accordance with the invention are also commercially available, for example Kraton Liquid® L-1253 which is produced from Kraton Liquid® L-1203 and is a hydrogenated polybutadiene methacrylate-functionalized to an extent of about 96% by weight, having about 50% each of 1,2 repeat units and 1,4 repeat units, from Kraton Polymers GmbH (Eschborn, Germany). Kraton® L-1253 is likewise synthesized according to GB 2270317.

The copolymer for use in accordance with the invention can be characterized on the basis of its molar branching level ("f-branch"). The molar branching level refers to the percentage in mol % of macromonomers (component (A)) used, based on the total molar amount of all the monomers in the monomer composition. The molar amount of the macromonomers used is calculated on the basis of the number-average molar mass $M_n$ of the macromonomers. The calculation of the branching level is described in detail in WO 2007/003238 A1, especially on pages 13 and 14, to which reference is made here explicitly.

The polyalkyl(meth)acrylate based comb polymers in accordance with the invention preferably have a molar degree of branching $f_{branch}$ of 0.1 to 2 mol %, more preferably 0.3 to 1.5 mol % and most preferably 0.5 to 1.1 mol %.

The molar degree of branching $f_{branch}$ is calculated as described in US 2010/0190671 A1 in paragraphs [0060] to [0065].

The polyalkyl(meth)acrylate based comb polymers in accordance with the invention can be prepared by free-radical polymerization and by related methods of controlled free-radical polymerization, for example ATRP (=atom transfer radical polymerization) or RAFT (=reversible addition fragmentation chain transfer).

Standard free-radical polymerization is detailed, inter alia, in Ullmann's Encyclopedia of Industrial Chemistry, Sixth Edition. In general, a polymerization initiator and optionally a chain transfer agent are used for this purpose.

The usable initiators include azo initiators widely known in the technical field, such as AIBN and 1,1-azobiscyclohexanecarbonitrile, and also peroxy compounds such as methyl ethyl ketone peroxide, acetylacetone peroxide, dilauryl peroxide, tert-butyl per-2-ethylhexanoate, ketone peroxide, tert-butyl peroctoate, methyl isobutyl ketone peroxide, cyclohexanone peroxide, dibenzoyl peroxide, tert-butyl peroxybenzoate, tert-butyl peroxyisopropylcarbonate, 2,5-bis (2-ethylhexanoylperoxy)-2,5-dimethylhexane, tert-butyl peroxy-2-ethylhexanoate, tert-butyl peroxy-3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis (4-tert-butylcyclohexyl) peroxydicarbonate, mixtures of two or more of the aforementioned compounds with one another, and mixtures of the aforementioned compounds with unspecified compounds which can likewise form free radicals. Suitable chain transfer agents are especially oil-soluble mercaptans, for example n-dodecyl mercaptan or 2-mercaptoethanol, or else chain transfer agents from the class of the terpenes, for example terpinolene.

The ATRP method is known per se. It is assumed that this is a "living" free-radical polymerization, but no restriction is intended by the description of the mechanism. In these processes, a transition metal compound is reacted with a compound having a transferable atom group. This involves transfer of the transferable atom group to the transition metal compound, as a result of which the metal is oxidized. This reaction forms a free radical which adds onto ethylenic groups. However, the transfer of the atom group to the transition metal compound is reversible, and so the atom group is transferred back to the growing polymer chain, which results in formation of a controlled polymerization system. It is accordingly possible to control the formation of the polymer, the molecular weight and the molecular weight distribution.

This reaction regime is described, for example, by J.-S. Wang, et al., J. Am. Chem. Soc, vol. 117, p. 5614-5615 (1995), by Matyjaszewski, Macromolecules, vol. 28, p. 7901-7910 (1995). In addition, patent applications WO 96/30421, WO 97/47661, WO 97/18247, WO 98/40415 and WO 99/10387 disclose variants of the above-elucidated ATRP. In addition, the polymers of the invention can also be obtained via RAFT methods, for example. This method is described in detail, for example, in WO 98/01478 and WO 2004/083169.

The polymerization can be conducted under standard pressure, reduced pressure or elevated pressure. The polymerization temperature is also uncritical. In general, however, it is in the range from −20 to 200° C., preferably 50 to 150° C. and more preferably 80 to 130° C.

The polymerization can be conducted with or without solvent. The term "solvent" should be understood here in a broad sense. The solvent is selected according to the polarity of the monomers used, it being possible with preference to use 100N oil, comparatively light gas oil and/or aromatic hydrocarbons, for example toluene or xylene.

The polymers according to the present invention are characterized by their contribution to reduce Noack evaporation losses of lubricating compositions.

They are also characterized by excellent shear stability, low HTHS viscosity in the effective temperature range and by a high viscosity index (low $KV_{40}$).

The polyalkyl(meth)acrylate based comb polymers according to the present invention show excellent PSSI (Permanent Shear Stability Index) values in lubricating base oils, especially in Group III base oils.

Preferably, the PSSI of the comb polymers according to the present invention is not more than 7, even more preferable below 3.

The present invention also relates to the use of the above-described polyalkyl(meth)acrylate based comb polymers for reducing Noack evaporation losses of lubricating compositions, especially of engine oil compositions.

The present invention further relates to a method of reducing Noack evaporation losses of lubricating compositions, especially of engine oil compositions, by applying the above-described polyalkyl(meth)acrylate based comb polymers.

By using the polyalkyl(meth)acrylate based comb polymers according to the present invention, the Noack evaporation losses of lubricating compositions can be reduced by up to 10.8%, based on a 0W20 formulation.

For a thicker formulation, e.g. 5W30, which usually contains a higher amount of VI improver, the reduction would be even higher.

The polyalkyl(meth)acrylate based comb polymers according to the present invention can therefore be used in all common grades of motor oils having the viscosity characteristics defined in the document SAE J300.

A second object of the present invention is directed to an additive composition, comprising:
(A) a base oil, and
(B) a polyalkyl(meth)acrylate based comb polymer, comprising the following monomers:
    (a) 10 to 25% by weight of esters of (meth)acrylic acid and a hydroxylated hydrogenated polybutadiene; and
    (b) 0.5% to 11% by weight, preferably 0.5 to 5% by weight, of $C_{4-18}$ alkyl acrylates.

A preferred second object is directed to an additive composition, comprising:
(A) a base oil; and
(B) a polyalkyl(meth)acrylate based comb polymer, comprising the following monomers:
    (a) 10 to 25% by weight of an ester of (meth)acrylic acid and a hydroxylated hydrogenated polybutadiene;
    (b) 0.5% to 11% by weight of $C_{4-18}$ alkyl acrylates;
    (c) 0% to 1% by weight of methyl methacrylate;
    (d) 55% to 70% by weight of n-butyl methacrylate;
    (e) 5% to 20% by weight of $C_{10-15}$ alkyl methacrylates, preferably $C_{12-14}$ alkyl methacrylates; and
    (f) 0% to 2% by weight of styrene monomers.

A further preferred second object is directed to an additive composition, comprising:
(A) a base oil; and
(B) a polyalkyl(meth)acrylate based comb polymer, comprising the following monomers:
    (a) 13 to 23% by weight of an ester of (meth)acrylic acid and a hydroxylated hydrogenated polybutadiene;
    (b) 0.5% to 11% by weight of $C_{4-18}$ alkyl acrylates;
    (c) 0.1% to 0.3% by weight of methyl methacrylate;
    (d) 55% to 70% by weight of n-butyl methacrylate;
    (e) 5% to 18% by weight of $C_{10-15}$ alkyl methacrylates, preferably $C_{12-14}$ alkyl methacrylates; and
    (f) 0.1% to 2% by weight of styrene monomers.

A further preferred second object is directed to an additive composition, comprising:
(A) a base oil; and
(B) a polyalkyl(meth)acrylate based comb polymer, comprising the following monomers:
    (a) 13 to 14% by weight of an ester of (meth)acrylic acid and a hydroxylated hydrogenated polybutadiene;
    (b) 0.5% to 5% by weight of $C_{4-18}$ alkyl acrylates;
    (c) 0.1% to 0.3% by weight of methyl methacrylate;
    (d) 63% to 70% by weight of n-butyl methacrylate;
    (e) 13% to 18% by weight of $C_{10-15}$ alkyl methacrylates, preferably $C_{12-14}$ alkyl methacrylates; and
    (f) 0.1% to 0.3% by weight of styrene monomers.

A further preferred second object is directed to an additive composition, comprising:
(A) a base oil; and
(B) a polyalkyl(meth)acrylate based comb polymer, comprising the following monomers:
    (a) 13 to 14% by weight of an ester of (meth)acrylic acid and a hydroxylated hydrogenated polybutadiene;
    (b) 0.5% to 5% by weight of $C_{4-18}$ alkyl acrylates;
    (c) 0.1% to 0.3% by weight of methyl methacrylate;
    (d) 66% to 70% by weight of n-butyl methacrylate;
    (e) 16% to 18% by weight of $C_{10-15}$ alkyl methacrylates, preferably $C_{12-14}$ alkyl methacrylates; and
    (f) 0.1% to 0.3% by weight of styrene monomers.

The content of each component (a), (b), (c), (d), (e) and (f) is based on the total composition of the polyalkyl(meth)acrylate based comb polymer.

In a particular embodiment, the proportions of components (a), (b), (c), (d), (e) and (f) add up to 100% by weight.

The additive compositions according to the present invention are further characterized by a high viscosity index (VI). The VI is at least 245, preferably in the range of 245 to 350, more preferably in the range of 250 to 310.

The base oil to be used in the additive composition comprises an oil of lubricating viscosity. Such oils include natural and synthetic oils, oil derived from hydrocracking, hydrogenation, and hydro-finishing, unrefined, refined, re-refined oils or mixtures thereof.

The base oil may also be defined as specified by the American Petroleum Institute (API) (see April 2008 version of "Appendix E-API Base Oil Interchangeability Guidelines for Passenger Car Motor Oils and Diesel Engine Oils", section 1.3 Sub-heading 1.3. "Base Stock Categories").

The API currently defines five groups of lubricant base stocks (API 1509, Annex E - API Base Oil Interchangeability Guidelines for Passenger Car Motor Oils and Diesel Engine Oils, September 2011). Groups I, II and III are mineral oils which are classified by the amount of saturates and sulphur they contain and by their viscosity indices; Group IV are polyalphaolefins; and Group V are all others, including e.g. ester oils. Ester oils which can be used in accordance with the present invention are preferably selected from the group consisting of Plastomoll DNA, DIOS and mixtures thereof; DIOS being even more preferred. The table below illustrates these API classifications.

| Group | Saturates | Sulphur content | Viscosity Index (VI) |
|---|---|---|---|
| I | <90% | >0.03% | 80-120 |
| II | at least 90% | not more than 0.03% | 80-120 |
| III | at least 90% | not more than 0.03% | at least 120 |
| IV | All polyalphaolefins (PAOs) | | |
| V | All others not included in Groups I, II, III or IV (e.g. ester oils) | | |

The kinematic viscosity at 100° C. (KVioo) of appropriate apolar base oils used to prepare an additive composition or lubricating composition in accordance with the present invention is preferably in the range of 3 mm$^2$/s to 10 mm$^2$/s, more preferably in the range of 4 mm$^2$/s to 8 mm$^2$/s, according to ASTM D445.

Further base oils which can be used in accordance with the present invention are Group II-III Fischer-Tropsch derived base oils.

Fischer-Tropsch derived base oils are known in the art. By the term "Fischer-Tropsch derived" is meant that a base oil is, or is derived from, a synthesis product of a Fischer-Tropsch process. A Fischer-Tropsch derived base oil may also be referred to as a GTL (Gas-To-Liquids) base oil. Suitable Fischer-Tropsch derived base oils that may be conveniently used as the base oil in the lubricating composition of the present invention are those as for example disclosed in EP 0 776 959, EP 0 668 342, WO 97/21788, WO 00/15736, WO 00/14188, WO 00/14187, WO 00/14183, WO 00/14179, WO 00/08115, WO 99/41332, EP 1 029 029, WO 01/18156, WO 01/57166 and WO 2013/189951.

Especially for engine oil formulations are used base oils of API Group III.

The additive composition of the present invention comprises preferably 60% to 80% by weight of base oil (component (A)), preferably 70% to 75% by weight, based on the total weight of the additive composition.

Further preferred is an additive composition, comprising as component (A):
(A1) 54 to 80% by weight, preferably 64 to 75% by weight, of a base oil selected from the group consisting of API Group I oils, Group II oils, Group III oils, Group IV oils and mixture thereof, and
(A2) 0 to 6% by weight of API Group V oils, preferably dioctylsebacate (DIOS), based on the total weight of the additive composition.

Even further preferred is an additive composition, comprising as component (A):
(A1) 54 to 76% by weight, preferably 64 to 71% by weight, of a base oil selected from the group consisting of API Group I oils, Group II oils, Group III oils, Group IV oils and mixture thereof, and
(A2) 4 to 6% by weight, of API Group V oils, preferably dioctylsebacate (DIOS), based on the total weight of the additive composition.

The concentration of the polyalkyl(meth)acrylate based comb polymer (component (B)) in the additive composition is preferably in the range from 20% to 40% by weight, more preferably in the range of 25% to 30% by weight, based on the total weight of the additive composition.

Further preferred contents of components (A) and (B) in the additive compositions according to the present invention are as detailed in the following table:

| Additive Composition | Component (A) [% by weight] | Component (B) [% by weight] |
| --- | --- | --- |
| (1) | 60 to 80 | 20 to 40 |
| (2) | (A1) 54 to 80 (A2) 0 to 6 | 20 to 40 |
| (3) | (A1) 54 to 76 (A2) 4 to 6 | 20 to 40 |
| (4) | 70 to 75 | 25 to 30 |
| (5) | (A1) 64 to 75 (A2) 0 to 6 | 25 to 30 |
| (6) | (A1) 64 to 71 (A2) 4 to 6 | 25 to 30 |

The content of each component (A) and (B) is based on the total weight of the additive composition.

In a particular embodiment, the proportions of components (A) and (B) add up to 100% by weight.

The present invention also relates to the above-described additive composition, which is characterized by its reduced Noack evaporation loss.

The present invention therefore further relates to the additive composition described above, which preferably has a Noack evaporation loss in the range of 15 to 20%, determined at 250° C. for 1 hour to CEC L-40B.

The present invention further relates to the use of the above-described additive compositions as viscosity index (VI) improvers which, at the same time, reduce the Noack evaporation losses of lubricating oil compositions.

By using the additive compositions according to the present invention, Noack evaporation losses can be reduced by up to 48%, determined at 250° C. for 1 hour to CEC L-40B.

The present invention further relates to a method of reducing Noack evaporation losses of lubricating oil compositions, especially of engine oil compositions, by applying the above-described additive compositions.

The additive compositions are further defined by excellent shear stability (low PSSI values) and low KV4o values.

A third object of the present invention is directed to a lubricating oil composition, comprising:
(A) 75 to 99.5% by weight of a base oil;
(B) 0.5 to 10% by weight of a polyalkyl(meth)acrylate based comb polymer, comprising the following monomers:
(a) 10 to 25% by weight of esters of (meth)acrylic acid and a hydroxylated hydrogenated polybutadiene;
(b) 0.5% to 11% by weight, preferably 0.5 to 5% by weight, of $C_{4-18}$ alkyl acrylates; and
(C) 0 to 15% by weight of one or more further additives.

A preferred third object of the present invention is directed to a lubricating oil composition, comprising:
(A) 75 to 99.5% by weight of a base oil;
(B) 0.5 to 10% by weight of a polyalkyl(meth)acrylate based comb polymer, comprising the following monomers:
(a) 10 to 25% by weight of an ester of (meth)acrylic acid and a hydroxylated hydrogenated polybutadiene;
(b) 0.5% to 11% by weight of $C_{4-18}$ alkyl acrylates;
(c) 0% to 1% by weight of methyl methacrylate;
(d) 55% to 70% by weight of n-butyl methacrylate;
(e) 5% to 20% by weight of $C_{10-15}$ alkyl methacrylates, preferably $C_{12-14}$ alkyl methacrylates;
(f) 0% to 2% by weight of styrene monomers; and
(C) 0 to 15% by weight of one or more further additives.

A further preferred third object of the present invention is directed to a lubricating oil composition, comprising:
(A) 75 to 99.5% by weight of a base oil;
(B) 0.5 to 10% by weight of a polyalkyl(meth)acrylate based comb polymer, comprising the following monomers:
(a) 13 to 23% by weight of an ester of (meth)acrylic acid and a hydroxylated hydrogenated polybutadiene;
(b) 0.5% to 11% by weight of $C_{4-18}$ alkyl acrylates;
(c) 0.1% to 0.3% by weight of methyl methacrylate;
(d) 55% to 70% by weight of n-butyl methacrylate;
(e) 5% to 18% by weight of $C_{10-15}$ alkyl methacrylates, preferably $C_{12-14}$ alkyl methacrylates;
(f) 0.1% to 2% by weight of styrene monomers;
(C) 0 to 15% by weight of one or more further additives.

A further preferred third object of the present invention is directed to a lubricating oil composition, comprising:
(A) 75 to 99.5% by weight of a base oil;
(B) 0.5 to 10% by weight of a polyalkyl(meth)acrylate based comb polymer, comprising the following monomers:
(a) 13 to 14% by weight of an ester of (meth)acrylic acid and a hydroxylated hydrogenated polybutadiene;
(b) 0.5% to 5% by weight of $C_{4-18}$ alkyl acrylates;
(c) 0.1% to 0.3% by weight of methyl methacrylate;
(d) 63% to 70% by weight of n-butyl methacrylate;

(e) 13% to 18% by weight of $C_{10-15}$ alkyl methacrylates, preferably $C_{12-14}$ alkyl methacrylates;

(f) 0.1% to 0.3% by weight of styrene monomers, and (C) 0 to 15% by weight of one or more further additives.

A further preferred third object of the present invention is directed to a lubricating oil composition, comprising:

(A) 75 to 99.5% by weight of a base oil;

(B) 0.5 to 10% by weight of a polyalkyl(meth)acrylate based comb polymer, comprising the following monomers:

(a) 13 to 14% by weight of an ester of (meth)acrylic acid and a hydroxylated hydrogenated polybutadiene;

(b) 0.5% to 5% by weight of $C_{4-18}$ alkyl acrylates;

(c) 0.1% to 0.3% by weight of methyl methacrylate;

(d) 66% to 70% by weight of n-butyl methacrylate;

(e) 16% to 18% by weight of $C_{10-15}$ alkyl methacrylates, preferably $C_{12-14}$ alkyl methacrylates;

(f) 0.1% to 0.3% by weight of styrene monomers; and (C) 0 to 15% by weight of one or more further additives.

The content of each component (a), (b), (c), (d), (e) and (f) is based on the total composition of the polyalkyl(meth)acrylate based comb polymer.

In a particular embodiment, the proportions of components (a), (b), (c), (d), (e) and (f) add up to 100% by weight.

The content of each component (A), (B) and (C) is based on the total composition of the lubricating oil composition.

The lubricating oil compositions according to the present invention are characterized by their low Noack evaporation losses.

The present invention therefore further relates to the lubricating oil composition described above, which preferably has a Noack evaporation loss of 12.8 to 15.2%, determined at 250° C. for 1 hour to CEC L-40B.

The lubricating oil compositions according to the present invention are further characterized by their low $HTHS_{100}$ and $HTHS_{80}$ values, determined to CEC L-036, and their low $KV_{40}$ values, determined to ASTM D445.

Especially, when formulated to a given $HTHS_{150}$ target of 2.6 mPas for a 0W20 formulation according to SAE J300 the lubricating oil formulations of the present invention show $HTHS_{100}$ values in the range of 4.0 to 5.0 mPas and $KV_{40}$ values in the range of 23 to 25 mm²/s.

The present invention also relates to the above-described lubricating oil composition, which is characterized by its reduced CCS (Cold-Cranking Simulator) apparent viscosity at −35° C. to ASTM D 5293.

The lubricating oil composition of the present invention comprises preferably 80 to 99.5% by weight of a base oil (component (A)), based on the total weight of the lubricating oil composition.

Further preferred is a lubricating oil composition, comprising as component (A):

(A1) 74.25 to 99.45% by weight of a base oil selected from the group consisting of API Group I oils, Group II oils, Group III oils, Group IV oils and mixture thereof, and (A2) 0.05 to 0.75% by weight of API Group V oils, preferably dioctylsebacate, based on the total weight of the lubricating oil composition.

The concentration of the polyalkyl(meth)acrylate polymer (component (B)) in the lubricating oil composition is preferably in the range of 0.5 to 5% by weight, more preferably in the range of 2 to 4% by weight, based on the total weight of the lubricating oil composition.

Further preferred contents of components (A), (B) and (C) in the lubricating oil compositions according to the present invention are as detailed in the following table:

| Lubricating Oil Composition | Component (A) [% by weight] | Component (B) [% by weight] | Component (C) [% by weight] |
|---|---|---|---|
| (1) | 75 to 99.5 | 0.5 to 10 | 0 to 15 |
| (1a) | (A1) 74.25 to 99.45 (A2) 0.05 to 0.75 | 0.5 to 10 | 0 to 15 |
| (2) | 80 to 99.5 | 0.5 to 5 | 0 to 15 |
| (2a) | (A1) 79.25 to 99.45 (A2) 0.05 to 0.75 | 0.5 to 5 | 0 to 15 |
| (3) | 81 to 98 | 2 to 4 | 0 to 15 |
| (3a) | (A1) 80.25 to 97.95 (A2) 0.05 to 0.75 | 2 to 4 | 0 to 15 |
| (4) | 80 to 96.5 | 0.5 to 10 | 3 to 10 |
| (4a) | (A1) 79.25 to 96.45 (A2) 0.05 to 0.75 | 0.5 to 10 | 3 to 10 |
| (5) | 85 to 96.5 | 0.5 to 5 | 3 to 10 |
| (5a) | (A1) 84.25 to 96.45 (A2) 0.05 to 0.75 | 0.5 to 5 | 3 to 10 |
| (6) | 86 to 95 | 2 to 4 | 3 to 10 |
| (6a) | (A1) 85.25 to 94.95 (A2) 0.05 to 0.75 | 2 to 4 | 3 to 10 |

In a particular embodiment, the proportions of components (A), (B) and (C) add up to 100% by weight.

The lubricating oil composition according to the invention may also contain, as component (C), further additives selected from the group consisting of conventional VI improvers, dispersants, defoamers, detergents, antioxidants, pour point depressants, antiwear additives, extreme pressure additives, friction modifiers, anticorrosion additives, dyes and mixtures thereof.

Conventional VI improvers include hydrogenated styrene-diene copolymers (HSDs, U.S. Pat. Nos. 4,116,917, 3,772,196 and 4,788,316), especially based on butadiene and isoprene, and also olefin copolymers (OCPs, K. Marsden: "Literature Review of OCP Viscosity Modifiers", Lubrication Science 1 (1988), 265), especially of the poly (ethylene-co-propylene) type, which may often also be present in N/O-functional form with dispersing action, or PAMAs, which are usually present in N-functional form with advantageous additive properties (boosters) as dispersants, wear protection additives and/or friction modifiers (DE 1 520 696 to Rohm and Haas, WO 2006/007934 to RohMax Additives).

Compilations of VI improvers and pour point improvers for lubricant oils, especially motor oils, are detailed, for example, in T. Mang, W. Dresel (eds.): "Lubricants and Lubrication", Wiley-VCH, Weinheim 2001: R. M. Mortier, S. T. Orszulik (eds.): "Chemistry and Technology of Lubricants", Blackie Academic & Professional, London 1992; or J. Bartz: "Additive fur Schmierstoffe", Expert-Verlag, Renningen-Malmsheim 1994.

Appropriate dispersants include poly(isobutylene) derivatives, for example poly(isobutylene)succinimides (PIBSIs), including borated PIBSIs; and ethylene-propylene oligomers having N/O functionalities.

Dispersants (including borated dispersants) are preferably used in an amount of 0 to 5% by weight, based on the total amount of the lubricating oil composition.

Suitable defoamers are silicone oils, fluorosilicone oils, fluoroalkyl ethers, etc.

The defoaming agent is preferably used in an amount of 0.005 to 0.1% by weight, based on the total amount of the lubricating oil composition.

The preferred detergents include metal-containing compounds, for example phenoxides; salicylates; thiophosphonates, especially thiopyrophosphonates, thiophosphonates and phosphonates; sulfonates and carbonates. As metal, these compounds may contain especially calcium, magnesium and barium. These compounds may preferably be used in neutral or overbased form.

Detergents are preferably used in an amount of 0.2 to 1% by weight, based on the total amount of the lubricating oil composition.

The suitable antioxidants include, for example, phenol-based antioxidants and amine-based antioxidants.

Phenol-based antioxidants include, for example, octadecyl-3-(3,5-di-tert-butyl-4-hydroxyphenyl)propionate; 4,4'-methylenebis(2,6-di-tert-butylphenol); 4,4'-bis(2,6-di-t-butylphenol); 4,4'-b is(2-methyl-6-t-butylphenol); 2,2'-methylenebis(4-ethyl-6-t-butylphenol); 2,2'-methylenebis(4-methyl-6-t-butyl phenol); 4,4'-butylidenebis(3-methyl-6-t-butylphenol); 4,4'-isopropylidenebis(2,6-di-t-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-t-butyl-4-methylphenol; 2,6-di-t-butyl-4-ethyl-phenol; 2,4-dimethyl-6-t-butylphenol; 2,6-di-t-amyl-p-cresol; 2,6-di-t-butyl-4-(N,N'-dimethylaminomethylphenol); 4,4'thiobis(2-methyl-6-t-butylphenol); 4,4'-thiobis(3-methyl-6-t-butylphenol); 2,2'-thiobis(4-methyl-6-t-butylphenol); bis(3-methyl-4-hydroxy-5-t-butylbenzyl) sulfide; bis(3,5-di-t-butyl-4-hydroxybenzyl) sulfide; n-octyl-3-(4-hydroxy-3,5-di-t-butylphenyl)propionate; n-octadecyl-3-(4-hydroxy-3,5-di-t-butylphenyl)propionate; 2,2'-thio[diethyl-bis-3-(3,5-di-t-butyl-4-hydroxyphenyl)propionate], etc. Of those, especially preferred are bis-phenol-based antioxidants and ester group containing phenol-based antioxidants. The amine-based antioxidants include, for example, monoalkyldiphenylamines such as monooctyldiphenylamine, mononoyldiphenylamine, etc.; dialkyldiphenylamines such as 4,4'-dibutyldiphenylamine, 4,4'-dipentyldiphenylamine, 4,4'-dihexyldiphenylamine, 4,4'-diheptyldiphenylamine, 4,4'-dioctyldiphenylamine, 4,4'-dinonyldiphenylamine, etc.; polyalkyldiphenylamines such as tetrabutyldiphenylamine, tetrahexyldiphenylamine, tetraoctyldiphenylamine, tetranonyldiphenylamine, etc.; naphthylamines, concretely alpha-naphthylamine, phenyl-alpha-naphthylamine and further alkyl-substituted phenyl-alpha-naphthylamines such as butylphenyl-alpha-naphthylamine, pentylphenyl-alpha-naphthylamine, hexylphenyl-alpha-naphthylamine, heptylphenyl-alpha-naphthylamine, octylphenyl-alpha-naphthylamine, nonylphenyl-alpha-naphthylamine, etc. Of those, diphenylamines are preferred to naphthylamines, from the viewpoint of the antioxidation effect thereof.

Suitable antioxidants may further be selected from the group consisting of compounds containing sulfur and phosphorus, for example metal dithiophosphates, for example zinc dithiophosphates (ZnDTPs), "OOS triesters"=reaction products of dithiophosphoric acid with activated double bonds from olefins, cyclopentadiene, norbornadiene, α-pinene, polybutene, acrylic esters, maleic esters (ashless on combustion); organosulfur compounds, for example dialkyl sulfides, diaryl sulfides, polysulfides, modified thiols, thiophene derivatives, xanthates, thioglycols, thioaldehydes, sulfur-containing carboxylic acids; heterocyclic sulfur/nitrogen compounds, especially dialkyldimercaptothiadiazoles, 2-mercaptobenzimidazoles; zinc bis(dialkyldithiocarbamate) and methylene bis(dialkyldithiocarbamate); organophosphorus compounds, for example triaryl and trialkyl phosphites; organocopper compounds and overbased calcium- and magnesium-based phenoxides and salicylates.

Antioxidants are used in an amount of 0 to 15% by weight, preferably 0.1 to 10% by weight, more preferably 0.5 to 5% by weight, based on the total amount of the lubricating oil composition.

The pour-point depressants include ethylene-vinyl acetate copolymers, chlorinated paraffin-naphthalene condensates, chlorinated paraffin-phenol condensates, polymethacrylates, polyalkylstyrenes, etc. Preferred are polymethacrylates having a mass-average molecular weight of from 5.000 to 50.000 g/mol.

The amount of the pour point depressant is preferably from 0.1 to 5% by weight, based on the total amount of the lubricating oil composition.

The preferred antiwear and extreme pressure additives include sulfur-containing compounds such as zinc dithiophosphate, zinc di-$C_{3-12}$-alkyldithiophosphates (ZnDTPs), zinc phosphate, zinc dithiocarbamate, molybdenum dithiocarbamate, molybdenum dithiophosphate, disulfides, sulfurized olefins, sulfurized oils and fats, sulfurized esters, thiocarbonates, thiocarbamates, polysulfides, etc.; phosphorus-containing compounds such as phosphites, phosphates, for example trialkyl phosphates, triaryl phosphates, e.g. tricresyl phosphate, amine-neutralized mono- and dialkyl phosphates, ethoxylated mono- and dialkyl phosphates, phosphonates, phosphines, amine salts or metal salts of those compounds, etc.; sulfur and phosphorus-containing anti-wear agents such as thiophosphites, thiophosphates, thiophosphonates, amine salts or metal salts of those compounds, etc.

The antiwear agent may be present in an amount of 0 to 3% by weight, preferably 0.1 to 1.5% by weight, more preferably 0.5 to 0.9% by weight, based on the total amount of the lubricating oil composition.

Friction modifiers used may include mechanically active compounds, for example molybdenum disulfide, graphite (including fluorinated graphite), poly(trifluoroethylene), polyamide, polyimide; compounds that form adsorption layers, for example long-chain carboxylic acids, fatty acid esters, ethers, alcohols, amines, amides, imides; compounds which form layers through tribochemical reactions, for example saturated fatty acids, phosphoric acid and thiophosphoric esters, xanthogenates, sulfurized fatty acids; compounds that form polymer-like layers, for example ethoxylated dicarboxylic partial esters, dialkyl phthalates, methacrylates, unsaturated fatty acids, sulfurized olefins or organometallic compounds, for example molybdenum compounds (molybdenum dithiophosphates and molybdenum dithiocarbamates MoDTCs) and combinations thereof with ZnDTPs, copper-containing organic compounds.

Friction modifiers may be used in an amount of 0 to 6% by weight, preferably 0.05 to 4% by weight, more preferably 0.1 to 2% by weight, based on the total amount of the lubricating oil composition.

Some of the compounds listed above may fulfil multiple functions. ZnDTP, for example, is primarily an antiwear additive and extreme pressure additive, but also has the character of an antioxidant and corrosion inhibitor (here: metal passivator/deactivator).

The above-detailed additives are described in detail, inter alia, in T. Mang, W. Dresel (eds.): "Lubricants and Lubrication", Wiley-VCH, Weinheim 2001; R. M. Mortier, S. T. Orszulik (eds.): "Chemistry and Technology of Lubricants".

Preferably, the total concentration of the one or more additives (C) is 0.05% to 15% by weight, more preferably 3% to 10% by weight, based on the total weight of the lubricating oil composition.

The invention has been illustrated by the following non-limiting examples.

EXPERIMENTAL PART

Abbreviations
AA alkyl acrylate
$C_4$ AA $C_4$-alkyl acrylate=n-butyl acrylate
$C_{16/18}$ AA $C_{16/18}$-alkyl acrylate
AMA alkyl methacrylate
$C_1$ AMA methacrylate=methyl methacrylate (MMA)
$C_4$ AMA $C_4$-alkyl methacrylate=n-butyl methacrylate
$C_{12-15}$ AMA $C_{12-15}$-alkyl methacrylate
DDM dodecanethiol
DIOS Dioctylsebacate (CAS: 122-62-3), Group V base oil from Sterinerie Debois with a $KV_{100}$ of 3.2 cSt
GTL 3 Shell Risella® X 415, Group V base oil from Shell, based on Gas-to-Liquid Technology, with a $KV_{100}$ of 2.7 cSt
GTL 4 Shell Risella® X 420, Group V base oil from Shell, based on Gas-to-Liquid Technology, with a $KV_{100}$ of 4.1 cSt
Gr III Oil Group III base oil mixture (NB 3043 and NB 3080 from Neste) with a $KV_{100}$ of 4.9 cSt
$HTHS_{80}$ high-temperature high-shear viscosity @80° C., measured according to CEC L-036
$HTHS_{100}$ high-temperature high-shear viscosity @100° C., measured according to CEC L-036
$HTHS_{150}$ high-temperature high-shear viscosity @150° C., measured according to CEC L-036
Hydroseal G232H mineral oil of petroleum origin
KV kinematic viscosity measured according to ASTM D445
$KV_{40}$ kinematic viscosity @40° C., measured according to ISO 3104
$KV_{100}$ kinematic viscosity @100° C., measured according to ISO 3104
LMA lauryl methacrylate, 73% C12, 27% C14, all linear
$M_n$ number-average molecular weight
$M_w$ weight-average molecular weight
NB 3020 Nexbase® 3020, Group III base oil from Neste with a $KV_{100}$ of 2.2 cSt
NB 3043 Nexbase® 3043, Group III base oil from Neste with a $KV_{100}$ of 4.3 cSt
OLOA 55501 DI Package for PCMO commercially available from Oronite
PCMO Passenger car motor oils
PDI Polydispersity index
SMA stearyl methacrylate, 33% C16, 67% C18, all linear
VI viscosity index, measured according to ISO 2909
Yubase 3 Group III base oil from SK Lubricants with a $KV_{100}$ of 3.0 cSt
Yubase 4 Group III base oil from SK Lubricants with a $KV_{100}$ of 4.2 cSt Test Methods The comb polymers according to the present invention and the comparative examples were characterized with respect to their molecular weight and PDI.

Molecular weights were determined by size exclusion chromatography (SEC) using commercially available polymethylmethacrylate (PMMA) standards. The determination is effected by gel permeation chromatography with THF as eluent (flow rate: 1 mL/min; injected volume: 100 µl).

The additive compositions including the comb polymers according to the present invention and comparative examples were characterized with respect to their viscosity index (VI) to ASTM D 2270, kinematic viscosity at 40° C. ($KV_{40}$) and 100° C. ($KV_{100}$) to ASTM D445 and with respect to their shear stability.

To show the shear stability of the additive compositions, the PSSI (Permanent Shear Stability Index) was calculated according to ASTM D 6022-01 (Standard Practice for Calculation of Permanent Shear Stability Index) based on data measured according to ASTM D 2603-B (Standard Test Method for Sonic Shear Stability of Polymer-Containing Oils).

The lubricating oil compositions including the comb polymers according to the present invention and comparative examples were characterized with respect to kinematic viscosity at 40° C. ($KV_{40}$) and 100° C. ($KV_{100}$) to ASTM D445, the viscosity index (VI) to ASTM D 2270, high-temperature high-shear viscosity at 80° C., 100° C. and 150° C. to CEC L-036, Noack evaporation loss at 250° C. for 1 hour to CEC L-40B and CCS (Cold-Cranking Simulator) apparent viscosity at −35° C. to ASTM D 5293.

Synthesis of a Hydroxylated Hydrogenated Polybutadiene

The macroalcohol prepared was a hydroxypropyl-terminated hydrogenated polybutadiene having a mean molar mass $M_n$=4750 g/mol.

The macroalcohol was synthesized by an anionic polymerization of 1,3-butadiene with butyllithium at 20-45° C. On attainment of the desired degree of polymerization, the reaction was stopped by adding propylene oxide and lithium was removed by precipitation with methanol. Subsequently, the polymer was hydrogenated under a hydrogen atmosphere in the presence of a noble metal catalyst at up to 140° C. and pressure 200 bar. After the hydrogenation had ended, the noble metal catalyst was removed and organic solvent was drawn off under reduced pressure. Finally, the base oil NB 3020 was used for dilution to a polymer content of 70% by weight.

The vinyl content of the macroalcohol was 61%, the hydrogenation level >99% and the OH functionality >98%. These values were determined by H-NMR (nuclear resonance spectroscopy).

Synthesis of Macromonomer (MM)

In a 2 L stirred apparatus equipped with saber stirrer, air inlet tube, thermocouple with controller, heating mantle, column having a random packing of 3 mm wire spirals, vapor divider, top thermometer, reflux condenser and substrate cooler, 1000 g of the above-described macroalcohol are dissolved in 450 g of methyl methacrylate (MMA) by stirring at 60° C. Added to the solution are 20 ppm of 2,2,6,6-tetramethylpiperidin-1-oxyl radical and 200 ppm of hydroquinone monomethyl ether. After heating to MMA reflux (bottom temperature about 110° C.) while passing air through for stabilization, about 20 g of MMA are distilled off for azeotropic drying. After cooling to 95° C., 0.30 g of LiOCH$_3$ is added and the mixture is heated back to reflux. After the reaction time of about 1 hour, the top temperature has fallen to ~64° C. because of methanol formation. The methanol/MMA azeotrope formed is distilled off constantly until a constant top temperature of about 100° C. is established again. At this temperature, the mixture is left to react for a further hour. For further workup, the bulk of MMA is drawn off under reduced pressure. Insoluble catalyst residues are removed by pressure filtration (Seitz T1000 depth filter). The content of NB 3020 "entrained" into the copolymer syntheses described further down was taken into account accordingly.

Synthesis of Comb Polymers
Process P1.1:

An apparatus with 4-neck flask and precision glass saber stirrer is initially charged with a 87.5 g mixture of low molecular weight monomers and macromonomer whose composition is shown in Table 1, and with 58.3 g of an oil mixture of Hydroseal G232H/NB3020/NB3043=65.56: 15.36:19.09. After heating to 90° C. under nitrogen, 0.2 g of tert-butylperoxy-2-ethyl-hexanoate is added and the temperature is maintained. Another 245.8 g of the monomer-oil mixture and 0.2 g tert-butylperoxy-2-ethyl-hexanoate is added within 3 hours. Then the reaction is maintained at 90° C. for another 2 h. Subsequently, the reaction mixture is diluted to 40% solids with NB3043 and 0.2% tert-butylperoxy-2-ethyl-hexanoate within 3 hours. Then the reaction is maintained at 90° C. for another 2 h and after this another 0.2% tert-butylperoxy-2-ethyl-hexanoate is added and the mixture is stirred at 90° C. overnight. The next day, the mixture is diluted to 25% solids with NB3043. 700 g of a 25% solution of comb polymers in mineral oil are obtained. The monomer components will add up to 100%. The amounts of initiator and dilution oil are given relative to the total amount of monomers.

Process P1.2:

Polymers were prepared by radical polymerization in oil as described in the general synthesis procedure of process P1.1 above with a modification in the oil mixture. Instead of Hydroseal G232H/NB3020/NB3043, an oil mixture of DIOS/NB3020/NB3043 =20:6:74 was used in the beginning of the reaction. The polymerization was conducted at 95° C.

Process P2:

An apparatus with 4-neck flask and precision glass saber stirrer is initially charged with a 87.5 g mixture of low molecular weight monomers and macromonomer whose composition is shown in Table 1, and with 41.9 g of an oil mixture of DIOS/NB3020/NB3043=41.7:20.6:37.7 (Examples 2-10) or DIOS/NB3020/NB3043=41.8:13.4:44.8 (Examples 11-16). After heating to 95° C. under nitrogen, 0.2 g of tert-butylperoxy-2-ethyl-hexanoate is added and the temperature is maintained. Another 87.5 g mixture of low molecular weight monomers and macromonomer and 0.2 g tert-butylperoxy-2-ethyl-hexanoate diluted with 283.1 g of NB3043 is added within 3 hours. Then the reaction is maintained at 95° C. and after one hour and after another 3 hours 0.35 g tert-butylperoxy-2-ethyl-hexanoate is added and the mixture is stirred at 95° C. overnight. The next day, the mixture is diluted to 25% solids with NB3043. 700 g of a 25% solution of comb polymers in mineral oil are obtained.

Table 1 shows the reaction mixtures used to prepare working examples and comparative examples.

The monomer components will add up to 100%. The amount of initiator is given relative to the total amount of monomers. The remaining amount (about 75%) is dilution oil as described above in the general proceedings used to prepare the polymers.

TABLE 1

Reaction mixtures used to prepare working examples and comparative examples

| | Monomers (25% of reaction mixture) | | | | | | | | |
|---|---|---|---|---|---|---|---|---|---|
| Ex # | MM [%] | C12-15 AMA [%] | C16/18 AA [%] | C4 AA [%] | C1 AMA [%] | C4 AMA [%] | Styrene [%] | Initiator [%] | Process type/oil mixture |
| 1*) | 24.0 | 10.12 | — | — | 0.2 | 64.4 | 1.28 | 0.2 | P1.1 |
| 2*) | 23.0 | 10.27 | — | — | 0.2 | 65.25 | 1.28 | 0.2 | P2 |
| 3 | 23.0 | 7.77 | 2.5 | — | 0.2 | 65.25 | 1.28 | 0.2 | P2 |
| 4 | 23.0 | 5.27 | 5.0 | — | 0.2 | 65.25 | 1.28 | 0.2 | P2 |
| 5 | 23.0 | 10.27 | 5.0 | — | 0.2 | 65.25 | 1.28 | 0.2 | P2 |
| 6 | 23.0 | 5.27 | 10.0 | — | 0.2 | 65.25 | 1.28 | 0.2 | P2 |
| 7 | 23.0 | 10.27 | — | 2.50 | 0.2 | 62.75 | 1.28 | 0.2 | P2 |
| 8 | 23.0 | 10.27 | — | 5.0 | 0.2 | 60.25 | 1.28 | 0.2 | P2 |
| 9 | 23.0 | 10.27 | — | 10.0 | 0.2 | 55.25 | 1.28 | 0.2 | P2 |
| 10 | 23.0 | 8.37 | 1.9 | 1.9 | 0.2 | 63.35 | 1.28 | 0.2 | P2 |
| 11 | 15.0 | 17.1 | 1.9 | 1.9 | 0.2 | 63.7 | 0.2 | 0.2 | P2 |
| 12*) | 15.0 | 17.1 | — | — | 0.2 | 67.5 | 0.2 | 0.2 | P2 |
| 13 | 15.0 | 17.1 | — | 2.50 | 0.2 | 65.0 | 0.2 | 0.2 | P2 |
| 14 | 15.0 | 17.1 | — | 5.0 | 0.2 | 62.5 | 0.2 | 0.2 | P2 |
| 15 | 15.0 | 17.1 | — | 0.5 | 0.2 | 67 | 0.2 | 0.2 | P2 |
| 16 | 15.0 | 17.1 | — | 1 | 0.2 | 66.5 | 0.2 | 0.2 | P2 |
| 17 | 14.0 | 13.3 | 1.9 | 1.9 | 0.2 | 68.5 | 0.2 | 0.2 | P1.2 |
| 18 | 15.0 | 13.1 | 1.9 | 1.9 | 0.2 | 67.7 | 0.2 | 0.2 | P1.2 |
| 19*) | 23.0 | 10.27 | — | 15.0 | 0.2 | 50.25 | 1.28 | 0.2 | P2 |
| 20*) | 23.0 | 10.27 | — | 25.0 | 0.2 | 40.25 | 1.28 | 0.2 | P2 |
| 21 | 15.0 | 17.1 | — | 10.0 | 0.2 | 57.5 | 0.2 | 0.2 | P2 |
| 22*) | 15.0 | 17.1 | — | 15.0 | 0.2 | 52.5 | 0.2 | 0.2 | P2 |
| 23*) | 15.0 | 17.1 | — | 25.0 | 0.2 | 42.5 | 0.2 | 0.2 | P2 |
| 24*) | 23.0 | — | 15.27 | — | 0.2 | 60.25 | 1.28 | 0.2 | P2 |

*)comparative example

Examples 1, 2 and 12 are comparative examples and do not comprise any alkyl acrylates. Examples 3 to 11 and 13 to 18 are in accordance with the present invention and comprise alkyl acrylates within the defined ranges.

The net compositions of the resulting comb polymers as well as their characteristic weight-average molecular weights $M_w$ and their polydispersity indices (PDI) are given in the following Table 2. Table 2 further shows the macromonomer conversion rate $MM_{conv}$, and the molar degree of branching $f_{branch}$ of the resulting comb polymers.

TABLE 2

Net compositions of the comb polymers prepared according to the present invention.

| | | | | Monomers in net composition | | | | | | GPC results | |
| --- | --- | --- | --- | --- | --- | --- | --- | --- | --- | --- | --- |
| | | | | C12-15 | C16/18 | C4 | C1 | C4 | | | |
| Example # | MM$_{conv.}$ [%] | f$_{branch}$ | MM [%] | AMA [%] | AA [%] | AA [%] | AMA [%] | AMA [%] | Styrene [%] | M$_w$ [g/mol] | PDI |
| Example 1*) | 92 | 0.96 | 22.51 | 10.32 | — | — | 0.20 | 65.66 | 1.31 | 549.000 | 4.26 |
| Example 2*) | 88 | 0.87 | 20.81 | 10.56 | — | — | 0.21 | 67.10 | 1.32 | 424.000 | 3.9 |
| Example 3 | 90 | 0.91 | 21.19 | 7.95 | 2.56 | — | 0.20 | 66.79 | 1.31 | 325.000 | 3.4 |
| Example 4 | 91 | 0.93 | 21.37 | 5.38 | 5.11 | — | 0.20 | 66.63 | 1.31 | 331.000 | 3.4 |
| Example 5 | 90 | 0.95 | 21.19 | 10.51 | 5.12 | — | 0.20 | 61.67 | 1.31 | 492.000 | 4.3 |
| Example 6 | 93 | 1.03 | 21.74 | 5.36 | 10.16 | — | 0.20 | 61.24 | 1.30 | 501.000 | 4.5 |
| Example 7 | 89 | 0.91 | 21.00 | 10.54 | — | 2.56 | 0.20 | 64.38 | 1.31 | 530.000 | 4.9 |
| Example 8 | 92 | 0.92 | 21.56 | 10.46 | — | 5.09 | 0.20 | 61.38 | 1.30 | 464.000 | 4.5 |
| Example 9 | 95 | 1.09 | 22.10 | 10.39 | — | 10.12 | 0.20 | 55.89 | 1.29 | 304.000 | 5.1 |
| Example 10 | 90 | 0.93 | 21.19 | 8.57 | 1.94 | 1.94 | 0.20 | 64.84 | 1.31 | 374.000 | 3.5 |
| Example 11 | 91 | 0.58 | 13.84 | 17.33 | 1.93 | 1.93 | 0.20 | 64.57 | 0.20 | 401.000 | 4.6 |
| Example 12*) | 89 | 0.54 | 13.57 | 17.39 | — | — | 0.20 | 68.63 | 0.20 | 253.000 | 3.3 |
| Example 13 | 89 | 0.56 | 13.57 | 17.39 | — | 2.54 | 0.20 | 66.09 | 0.20 | 417.000 | 3.9 |
| Example 14 | 91 | 0.59 | 13.84 | 17.33 | — | 5.07 | 0.20 | 63.36 | 0.20 | 404.000 | 4.2 |
| Example 15 | 89 | 0.55 | 13.57 | 17.39 | — | 0.51 | 0.20 | 68.12 | 0.20 | 497.000 | 4.6 |
| Example 16 | 89 | 0.55 | 13.57 | 17.39 | — | 1.02 | 0.20 | 67.62 | 0.20 | 419.000 | 4.3 |
| Example 17 | 93 | 0.52 | 13.15 | 13.43 | 1.92 | 1.92 | 0.20 | 69.18 | 0.20 | 482.000 | 3.59 |
| Example 18 | 92 | 0.57 | 13.97 | 13.26 | 1.92 | 1.92 | 0.20 | 68.52 | 0.20 | 560.000 | 4.91 |
| Example 19*) | 97 | 1.19 | 22.47 | 10.34 | — | 15.10 | 0.20 | 50.60 | 1.29 | 201000 | 3.84 |
| Example 20*) | 97 | 1.44 | 22.47 | 10.34 | — | 25.17 | 0.20 | 40.53 | 1.29 | 145000 | 3.67 |
| Example 21 | 96 | 0.67 | 14.49 | 17.20 | — | 10.06 | 0.20 | 57.85 | 0.20 | 231000 | 3.74 |
| Example 22*) | 96 | 0.72 | 14.49 | 17.20 | — | 15.09 | 0.20 | 52.82 | 0.20 | 222000 | 3.55 |
| Example 23*) | 98 | 0.88 | 14.74 | 17.15 | — | 25.08 | 0.20 | 42.63 | 0.20 | 196000 | 3.21 |
| Example 24*) | 95 | 1.09 | 22.10 | — | 15.45 | — | 0.20 | 60.95 | 1.29 | 251000 | 3.23 |

*)comparative example

Examples 3 to 7 and 11 to 18 and 21 are inventive examples and comprise the alkyl acrylates in amounts as specified in the present invention.

Examples 1, 2 and 12 are comparative examples and do not comprise any alkyl acrylates. Examples 19, 20 and 22-24 are comparative examples with higher amounts of alkyl acrylates which are outside the claimed ranges.

Evaluation of the VI Improver Candidates

To demonstrate the improved effect of additive compositions comprising polyalkyl(methacrylate) based comb polymers according to the present invention on the Noack evaporation loss, corresponding additive compositions of comb polymers in base oil were prepared and the corresponding Noack evaporation losses at 250° C. were determined to CEC L-40B. The results are outlined in Table 3.

TABLE 3

Noack evaporation losses of polymers in base oil (=additive composition A)

| Additive # | polymer used | polymer content [%] | acrylate in the net polymer [Mol %] | Oil A (Group III) [%] | Oil B (DIOS) [%] | NOACK [%] |
| --- | --- | --- | --- | --- | --- | --- |
| A0 | — | — | — | 93.33 | 6.67 | 15.5 |
| A1*) | Example 1 | 25 | — | 70.0 (+5% Hydroseal) | — | 29.6 |
| A2*) | Example 2 | 25 | — | 70.0 | 5.0 | 20.9 |
| A3 | Example 3 | 25 | 1.6 | 70.0 | 5.0 | 18.2 |
| A4 | Example 4 | 25 | 3.1 | 70.0 | 5.0 | 16.2 |
| A5 | Example 5 | 25 | 3.2 | 70.0 | 5.0 | 16.2 |
| A6 | Example 6 | 25 | 6.5 | 70.0 | 5.0 | 15.3 |
| A7 | Example 7 | 25 | 3.8 | 70.0 | 5.0 | 16.3 |
| A8 | Example 8 | 25 | 7.5 | 70.0 | 5.0 | 15.4 |
| A9 | Example 9 | 25 | 14.9 | 70.0 | 5.0 | 15.6 |
| A10 | Example 10 | 25 | 4.0 | 70.0 | 5.0 | 17.1 |
| A11 | Example 11 | 25 | 3.9 | 70.0 | 5.0 | 16.6 |
| A12*) | Example 12 | 25 | — | 70.0 | 5.0 | 21.2 |
| A13 | Example 13 | 25 | 3.6 | 70.0 | 5.0 | 16.8 |
| A14 | Example 14 | 25 | 7.1 | 70.0 | 5.0 | 15.3 |
| A15 | Example 15 | 25 | 0.7 | 70.0 | 5.0 | 20.2 |
| A16 | Example 16 | 25 | 1.4 | 70.0 | 5.0 | 18.7 |
| A17 | Example 17 | 25 | 3.7 | 70.0 | 5.0 | 16.0 |
| A18 | Example 18 | 25 | 3.8 | 70.0 | 5.0 | 15.8 |
| A19*) | Example 19 | 25 | 22.11 | 70.0 | 5.0 | 14.0 |
| A20*) | Example 20 | 25 | 36.32 | 70.0 | 5.0 | 14.9 |
| A21 | Example 21 | 25 | 14.05 | 70.0 | 5.0 | 14.8 |
| A22*) | Example 22 | 25 | 20.93 | 70.0 | 5.0 | 14.3 |

TABLE 3-continued

Noack evaporation losses of polymers in base oil (=additive composition A)

| Additive # | polymer used | polymer content [%] | acrylate in the net polymer [Mol %] | Oil A (Group III) [%] | Oil B (DIOS) [%] | NOACK [%] |
|---|---|---|---|---|---|---|
| A23*) | Example 23 | 25 | 34.41 | 70.0 | 5.0 | 13.8 |
| A24*) | Example 24 | 25 | 9.93 | 70.0 | 5.0 | 15.1 |

*)comparative example

In Table 3 are shown additive compositions having polymer concentrations of 25%. Apart from A1, there is always used the same oil mixture of Oil A and Oil B in a ratio of 14:1.

Generally, the addition of polyalkyl(meth)acrylate polymers to a base oil leads to an increased Noack. Table 3 shows that the base oil mixture itself (additive composition A0) has a Noack of 15.5%. The addition of 25% of e.g. Example 2 (additive composition A2) raises the Noack to 29.6%.

From Table 3 it is visible that the Noack evaporation loss of the additive compositions depends strongly on a) the base oil used (please see A1 and A2) and b) the polymer composition used, more specifically the amount of acrylate in the polymer (please see A3-A11 and A13-A18). Regarding a), the influence of the base oil, the comparison of A1 and A2 shows that with the addition of a base oil with higher boiling point, like e.g. DIOS, the Noack evaporation loss of the additive composition was reduced by 29% (see A2 compared to A1: A2 shows a Noack of 20.9% compared to 29.6% of A1. That means a reduction of 29%).

Moreover, it was found that changing the polymer composition by incorporation of acrylate units in the comb polymer surprisingly leads to an additional reduction of Noack evaporation loss by 27% (see A2 and A6 or A14). In this case, an acrylate amount of about 7 mol % was used and the Noack value of 15.3 approximately met the Noack of the pure base oil mix without polymer additive (A0). This is an indication that at this acrylate amount the contribution of the polymer to the Noack evaporation loss was minimized. Additionally, it can be seen that already very small amounts of acrylates (1.6 to 3.1 mol %) resulted in a significant decrease of Noack by 13 to 22%. In general, the more acrylate was incorporated in the comb polymer the lower the Noack evaporation loss was, independent of the type of acrylate used (C4 AA or C16/18 AA). Combining effects a) and b) leads to a total reduction of Noack by up to 48%.

Table 3 also shows that the addition of more than about 10-11% of alkyl acrylates does not give significant further improvement of Noack evaporation loss. But the addition of more than 10-11% of alkyl acrylates does lead to other drawbacks in relation to formulation parameters. This will be shown further down in Tables 5 and 6.

To show the shear stability of the polyalkyl(meth)acrylate based comb polymers according to the present invention, the additive compositions A1 to A18 as disclosed in table 3 above were mixed with a dilution oil to give an additive composition comprising 15% of the corresponding additive composition. The PSSI values are outlined in the following Table 4 together with the kinematic viscosity data of the additive compositions.

TABLE 4

Data showing viscometrics and shear stability of 15% of the additive composition of Table 3 comprising the comb polymers prepared according to the present invention.

| product Additive composition used | 15% additive composition in Group III oil* | | | 15% addtive composition in Group III oil*) after 12.5 min sonic shear | | | | |
|---|---|---|---|---|---|---|---|---|
| | $KV_{100}$ [mm²/s] | $KV_{40}$ [mm²/s] | VI | $KV_{100}$ [mm²/s] | $KV_{40}$ [mm²/s] | VI | PSSI 100° C. | PSSI 40° C. |
| A1**) | nd | nd | nd | nd | nd | nd | nd | nd |
| A2**) | 8.1 | 30.1 | 263 | 8.1 | 30.1 | 262 | 1.6 | 1.5 |
| A3 | 7.9 | 30.6 | 250 | 7.9 | 30.5 | 248 | 1.6 | 2.0 |
| A4 | 8.0 | 30.7 | 253 | 7.9 | 30.5 | 250 | 3.5 | 3.5 |
| A5 | 9.4 | 32.0 | 300 | 9.2 | 31.6 | 295 | 4.2 | 4.1 |
| A6 | 9.1 | 31.9 | 288 | 8.8 | 34.2 | 281 | 6.4 | 4.8 |
| A7 | 8.5 | 30.4 | 278 | 8.4 | 30.2 | 276 | 2.2 | 2.6 |
| A8 | 8.5 | 30.6 | 277 | 8.4 | 30.5 | 275 | 2.2 | 2.2 |
| A9 | 7.9 | 30.7 | 247 | 7.9 | 30.6 | 245 | 1.7 | 1.2 |
| A10 | 8.2 | 30.6 | 262 | 8.2 | 30.4 | 261 | 1.2 | 2.8 |
| A11 | 8.9 | 30.4 | 298 | 8.9 | 30.3 | 296 | 1.7 | 1.6 |
| A12**) | 7.7 | 29.7 | 249 | 7.7 | 29.7 | 248 | 1.1 | 1.4 |
| A13 | 8.7 | 29.8 | 294 | 8.7 | 29.7 | 293 | 1.1 | 1.6 |
| A14 | 8.7 | 30.6 | 294 | nd | nd | nd | nd | nd |
| A15 | 8.9 | 29.7 | 306 | 8.9 | 29.6 | 304 | 2.0 | 2.2 |
| A16 | 8.7 | 29.8 | 293 | 8.6 | 29.7 | 293 | 0.8 | 2.1 |
| A17 | 8.8 | 29.6 | 302 | 8.7 | 29.5 | 300 | 2.3 | 2.8 |
| A18 | 9.0 | 29.8 | 310 | 8.9 | 29.6 | 308 | 2.4 | 3.2 |

*)Group III base oil mixture (NB 3043 and NB 3080 from Neste) with $KV_{100}$ of 4.9 cSt
**)comparative example
nd not determined Table 4 shows that all additive compositions achieved excellent PSSI values at 100° C. of below 7; and most additive compositions achieved even lower PSSI values of not more than 3.

In addition, all additive compositions show $KV_{100}$ values in the range of 7.9 to 9.4 mm²/s and $KV_{40}$ values in the range of 29.6 to 32 mm²/s, i.e. in very narrow ranges.

As this is due for the compositions comprising the working examples (Examples A3 to A11 and A13 to A18) as well as comparative Examples (Examples A1, A2 and A12), that means that comb polymers in general show very high VIs.

It could be shown that the advantageous characteristics already described in the state of the art for comb polymers are maintained with the new comb polymers described herein, but can additionally be combined with an improved Noack.

Evaluation of VI Improvers in Formulations

To demonstrate the effect of polyalkyl(methacrylate) based comb polymers according to the present invention on the Noack evaporation loss of lubricating oil compositions different formulation examples B were prepared and the corresponding Noack evaporation losses at 250° C. were determined to CEC L-40B. Formulations B were prepared by adding the additives A1-A24 as described in Table 3 above.

TABLE 5

0W20 engine oil formulations B without DI package in Yubase 4 as base oil

| Parameter | B1*) | B2*) | B3 | B4 | B5 | B6 | B7 | B8 | B9 |
|---|---|---|---|---|---|---|---|---|---|
| Additive used | A1 | A2 | A3 | A4 | A5 | A6 | A7 | A8 | A9 |
| Additive content [%] | 12.5 | 12.8 | 12.5 | 14.0 | nd | 12.5 | 12.6 | 12.6 | 14.4 |
| $KV_{100}$ [mm²/s] | 7.29 | 6.74 | 7.58 | 6.92 | nd | 7.63 | 7.00 | 6.98 | 6.91 |
| $KV_{40}$ [mm²/s] | 23.82 | 23.78 | 24.91 | 24.79 | nd | 25.31 | 23.82 | 23.97 | 24.97 |
| VI | 303 | 268 | 303 | 265 | nd | 300 | 285 | 281 | 262 |
| CCS-35 [mPas] | — | 3257 | 3324 | 3130 | nd | 3314 | — | 3164 | 3107 |
| Noack [%] | 15.4 | 14.6 | 14.4 | 14.6 | nd | 14.1 | 14.3 | 14.1 | 14.2 |
| $HTHS_{80}$ [mPas] | 6.37 | 6.51 | 6.61 | 6.68 | nd | 6.69 | 6.37 | 6.41 | 6.71 |
| $HTHS_{100}$ [mPas] | 4.44 | 4.50 | 4.75 | 4.69 | nd | 4.80 | 4.50 | 4.58 | 4.77 |
| $HTHS_{150}$ [mPas] | 2.62 | 2.59 | 2.61 | 2.63 | nd | 2.59 | 2.60 | 2.59 | 2.61 |

| Parameter | B10 | B11 | B12*) | B13 | B14 | B15 | B16 | B17 | B18 |
|---|---|---|---|---|---|---|---|---|---|
| Additive used | A10 | A11 | A12 | A13 | A14 | A15 | A16 | A17 | A18 |
| Additive content [%] | 13.2 | 12.6 | 15.0 | 12.6 | 12.5 | 12.4 | 12.6 | 12.0 | 12.0 |
| $KV_{100}$ [mm²/s] | 6.85 | 7.14 | 6.92 | 7.02 | 7.01 | 7.09 | 6.96 | 6.85 | 7.05 |
| $KV_{40}$ [mm²/s] | 24.26 | 23.83 | 24.52 | 23.48 | 23.56 | 23.27 | 23.40 | 23.09 | 23.15 |
| VI | 268 | 294 | 269 | 292 | 290 | 300 | 289 | 287 | 299 |
| CCS-35 [mPas] | 3076 | 3196 | 3041 | 2986 | 3003 | 2992 | 2988 | 3007 | 3013 |
| Noack [%] | 14.6 | 14.1 | 14.6 | 14.5 | 14.2 | 14.3 | 14.3 | 14.1 | 14.2 |
| $HTHS_{80}$ [mPas] | 6.54 | 6.18 | 6.55 | 6.15 | 6.17 | 6.06 | 6.13 | 6.01 | 6.00 |
| $HTHS_{100}$ [mPas] | 4.58 | 4.57 | 4.79 | 4.45 | 4.51 | 4.30 | 4.38 | 4.28 | 4.24 |
| $HTHS_{150}$ [mPas] | 2.62 | 2.58 | 2.63 | 2.61 | 2.58 | 2.58 | 2.58 | 2.60 | 2.58 |

| Parameter | B19*) | B20*) | B21 | B22*) | B23*) | B24*) |
|---|---|---|---|---|---|---|
| Additive used | A19 | A20 | A21 | A22 | A23 | A24 |
| Additive content [%] | 16.0 | 18.0 | 15.2 | 15.2 | 16.7 | 15.0 |
| $KV_{100}$ [mm²/s] | 6.95 | 6.99 | 7.04 | 7.02 | 7.07 | 7.25 |
| $KV_{40}$ [mm²/s] | 26.24 | 27.54 | 25.34 | 25.35 | 26.33 | 27.36 |

TABLE 5-continued

| 0W20 engine oil formulations B without DI package in Yubase 4 as base oil | | | | | | |
|---|---|---|---|---|---|---|
| VI | 247 | 233 | 265 | 263 | 253 | 250 |
| CCS-35 [mPas] | 3273 | 3393 | 3126 | 3108 | 3188 | 3409 |
| Noack [%] | 13.8 | 14.2 | 14.0 | 13.9 | 13.9 | 14.0 |
| $HTHS_{80}$ [mPas] | 7.12 | 7.56 | 6.96 | 6.98 | 7.30 | 7.30 |
| $HTHS_{100}$ [mPas] | 5.07 | 5.26 | 5.03 | 5.05 | 5.18 | 5.12 |
| $HTHS_{150}$ [mPas] | 2.60 | 2.60 | 2.62 | 2.63 | 2.59 | 2.65 |

*[)]comparative example
nd not determined

Formulations with Yubase 4 as base oil were prepared by using formulation targets 0W20 according to SAE J300; i.e. it was formulated on an $HTHS_{150}$ target of 2.6 mPas. The resulting additive content was typically between 12-15%. Characteristic EO formulation properties ($KV_{40}$, $KV_{100}$, CCS, $HTHS_{100}$, $HTHS_{80}$) were measured and are summarized in Table 5. Comparing the comparative examples B1, B2 and B12 with the working examples shown in Table 5, a distinct decrease in Noack from 15.4% (B1) and 14.6% in case of B2 or B12, to 14.6 to14.1% (B3 to B11 and B13 to B18) is visible. It is also visible that the Noack evaporation loss of the engine oil formulations strongly depends on a) the base oil mix used in the additive composition (please see B1 and B2). Moreover, it was found that changing the polymer composition in the additive composition by incorporation of acrylate units in the comb polymer surprisingly leads to an additional reduction of Noack evaporation loss by 3.4% (see B2 and B6, B8, B11 or B17). Additionally, already very small amounts of acrylates (<4 mol %) in the additive composition resulted in a significant decrease of Noack in the engine oil formulation by 2.1 to 3.4%. In general, the more acrylate was incorporated in the comb polymer, the lower the Noack evaporation loss of the engine oil formulation was. Combining effects a) and b) leads to a total reduction of Noack by 8.4%.

TABLE 6 overview of results and conclusions

| | | Monomers in net composition | | | acrylate | | Formulation Details | | | | | |
|---|---|---|---|---|---|---|---|---|---|---|---|---|
| Formulation # | Polymer used | MM [wt %] | C16/18 AA [wt %] | C4 AA [wt %] | Sum of AA [wt %] | in the net polymer [Mol %] | Additive Content [wt %] | Noack [%] | VI | $KV_{40}$ [mm$^2$/s] | $HTHS_{80}$ [mPas] | $HTHS_{100}$ [mPas] |
| B1*[)] | Ex. 1 | 22.51 | — | — | 0 | 0 | 12.5 | 15.4 | 303 | 23.82 | 6.37 | 4.44 |
| B2*[)] | Ex. 2 | 20.81 | — | — | 0 | 0 | 12.8 | 14.6 | 268 | 23.78 | 6.51 | 4.50 |
| B3 | Ex. 3 | 21.19 | 2.56 | — | 2.56 | 1.6 | 12.5 | 14.4 | 303 | 24.91 | 6.61 | 4.75 |
| B10 | Ex. 10 | 21.19 | 1.94 | 1.94 | 3.88 | 4.0 | 13.2 | 14.6 | 268 | 24.26 | 6.54 | 4.58 |
| B4 | Ex. 4 | 21.37 | 5.11 | — | 5.11 | 3.1 | 14.0 | 14.6 | 265 | 24.79 | 6.68 | 4.69 |
| B5 | Ex. 5 | 21.19 | 5.12 | — | 5.12 | 3.2 | nd | nd | nd | nd | nd | nd |
| B6 | Ex. 6 | 21.74 | 10.16 | — | 10.16 | 6.5 | 12.5 | 14.1 | 300 | 25.31 | 6.69 | 4.80 |
| B24*[)] | Ex. 24 | 22.10 | 15.45 | — | 15.45 | 9.9 | 15.0 | 14.0 | 250 | 27.36 | 7.30 | 5.12 |
| B7 | Ex. 7 | 21.00 | — | 2.56 | 2.56 | 3.8 | 12.6 | 14.3 | 285 | 23.82 | 6.37 | 4.50 |
| B8 | Ex. 8 | 21.56 | — | 5.09 | 5.09 | 7.5 | 12.6 | 14.1 | 281 | 23.97 | 6.41 | 4.58 |
| B9 | Ex. 9 | 22.10 | — | 10.12 | 10.12 | 14.9 | 14.4 | 14.2 | 262 | 24.97 | 6.71 | 4.77 |
| B19*[)] | Ex. 19 | 22.47 | — | 15.10 | 15.10 | 22.1 | 16.0 | 13.8 | 247 | 26.24 | 7.12 | 5.07 |
| B20*[)] | Ex. 20 | 22.47 | — | 25.17 | 25.17 | 36.3 | 18.0 | 14.2 | 233 | 27.54 | 7.56 | 5.26 |
| B12*[)] | Ex. 12 | 13.57 | — | — | 0 | 0 | 15.0 | 14.6 | 269 | 24.52 | 6.55 | 4.79 |
| B15 | Ex. 15 | 13.57 | — | 0.51 | 0.51 | 0.7 | 12.4 | 14.3 | 300 | 23.27 | 6.06 | 4.30 |
| B16 | Ex. 16 | 13.57 | — | 1.02 | 1.02 | 1.4 | 12.6 | 14.3 | 289 | 23.40 | 6.13 | 4.38 |
| B13 | Ex. 13 | 13.57 | — | 2.54 | 2.54 | 3.6 | 12.6 | 14.5 | 292 | 23.48 | 6.15 | 4.45 |
| B17 | Ex. 17 | 13.15 | 1.92 | 1.92 | 3.84 | 3.7 | 12.0 | 14.1 | 287 | 23.09 | 6.01 | 4.28 |
| B18 | Ex. 18 | 13.97 | 1.92 | 1.92 | 3.84 | 3.8 | 12.0 | 14.2 | 299 | 23.15 | 6.00 | 4.24 |
| B11 | Ex. 11 | 13.84 | 1.93 | 1.93 | 3.86 | 3.9 | 12.6 | 14.1 | 294 | 23.83 | 6.18 | 4.57 |
| B14 | Ex. 14 | 13.84 | — | 5.07 | 5.07 | 7.1 | 12.5 | 14.2 | 290 | 23.56 | 6.17 | 4.51 |
| B21*[)] | Ex. 21 | 14.49 | — | 10.06 | 10.06 | 14.1 | 15.2 | 14.0 | 265 | 25.34 | 6.96 | 5.03 |
| B22*[)] | Ex. 22 | 14.49 | — | 15.09 | 15.09 | 20.9 | 15.2 | 13.9 | 263 | 25.35 | 6.98 | 5.05 |
| B23*[)] | Ex. 23 | 14.74 | — | 25.08 | 25.08 | 34.4 | 16.7 | 13.9 | 253 | 26.33 | 7.30 | 5.18 |

*[)]comparative example
nd not determined and B2) and b) the polymer composition used in the additive composition, more specifically the amount of acrylate in the polymer (please see B3 to B11 and B13 to B18).

Using base oils with higher boiling point in the additive composition, like e.g. DIOS, the Noack evaporation loss of the engine oil formulation was reduced by 5.2% (see B1 and Table 6 is a summary table showing certain data as already presented in Tables 2-5 above. Therein are listed the formulations B by their increasing acrylate content and the resulting formulation details.

It is visible that an increased acrylate content negatively influences the formulation performance. In all cases the VI is decreasing with very high acrylate content of above 11% by weight. The $HTHS_{80}$ and $HTHS_{100}$ as well as $KV_{40}$ are increasing and the treat rate is becoming very high. At the same time the Noack stays more or less constant and does not improve significantly anymore.

From US 2010/0190671 it is known that low $KV_{40}$, $HTHS_{80}$ and $HTHS_{100}$ values are necessary to achieve good fuel economy (see page 1, paragraph [0005] of US 2010/0190671). That means that the lubricating oil formulations according to the present invention can also be used to decrease fuel consumption.

TABLE 7

0 W 8 engine oil formulation with DI package in Yubase 3 as base oil (Formulation Examples C)

| Product | C1 | C2 |
|---|---|---|
| additive composition A1 [%] | 2.5 | |
| additive composition A8 [%] | | 3 |
| OLOA 55501 | 8.9 | 8.9 |
| Yubase 3 | 88.6 | 88.1 |
| Sum | 100 | 100 |
| Tests | | |
| $KV_{100}$ [mm²/s] | 4.44 | 4.50 |
| $KV_{40}$ [mm²/s] | 17.24 | 17.56 |
| VI | 183 | 183 |
| CCS-35 [mPas] | 1825 | 1796 |
| Noack [%] | 36.6 | 36.2 |
| $HTHS_{80}$ [mPas] | 4.81 | 4.90 |
| $HTHS_{100}$ [mPas] | 3.29 | 3.45 |
| $HTHS_{150}$ [mPas] | 1.69 | 1.72 |

Formulations with Yubase 3 as base oil and OLOA 55501 as DI package were prepared by using formulation targets of 0W8 according to SAE J300; i.e. it was formulated on an $HTHS_{150}$ target of 1.7 mPas. The resulting additive content was typically between 2.5 to 3%. Characteristic engine oil formulation properties ($KV_{40}$, $KV_{100}$, CCS, $HTHS_{100}$, $HTHS_{80}$) were measured and are summarized in Table 7.

It was found that changing the base oil composition and the polymer composition in the additive composition by incorporating acrylate units surprisingly leads to a reduction of Noack evaporation loss by 1.1% (see C1 and C2).

TABLE 8

0W 20 engine oil formulation with DI package in different base oil mixtures (Formulation Examples D)

| Product [%] | D1 | D2 | D3 | D4 | D5 | D6 | D7 | D8 |
|---|---|---|---|---|---|---|---|---|
| additive composition A1 | 9.7 | | | 8.3 | | | | |
| additive composition A8 | | 10.4 | 10.5 | | 8.2 | | 8.5 | |
| additive composition A7 | | | | | | 8.3 | | 8.5 |
| OLOA 55501 | 8.9 | 8.9 | 8.9 | 8.9 | 8.9 | 8.9 | 8.9 | 8.9 |
| Base Oil Mix 1* | 81.4 | 80.7 | | | | | | |
| Base Oil Mix 2* | | | 80.6 | | | | | |
| Base Oil Mix 3* | | | | 82.8 | 82.9 | 82.8 | | |
| Base Oil Mix 4* | | | | | | | 82.6 | 82.6 |
| Sum | 100 | 100 | 100 | 100 | 100 | 100 | 100 | 100 |
| Tests | | | | | | | | |
| $KV_{100}$ [mm²/s] | 7.22 | 7.22 | 7.16 | 7.51 | 7.24 | 7.29 | 7.25 | 7.29 |
| $KV_{40}$ [mm²/s] | 27.09 | 27.72 | 27.07 | 28.82 | 28.77 | 28.63 | 28.43 | 28.27 |
| VI | 252 | 244 | 249 | 247 | 233 | 238 | 237 | 242 |
| CCS-35 [mPas] | 3081 | 3161 | 3015 | 4508 | 4559 | 4599 | 4383 | 4425 |
| Noack [%] | 14.3 | 12.8 | 14.3 | 15.7 | 14.0 | 14.3 | 15.4 | 15.2 |
| $HTHS_{80}$ [mPas] | 6.92 | 7.03 | 6.94 | 7.20 | 7.24 | 7.25 | 7.20 | 7.17 |
| $HTHS_{100}$ [mPas] | 4.72 | 4.88 | 4.82 | 4.95 | 5.02 | 4.95 | 5.00 | 4.92 |
| $HTHS_{150}$ [mPas] | 2.60 | 2.65 | 2.60 | 2.62 | 2.61 | 2.60 | 2.57 | 2.60 |

*Base Oil Mix 1 = 5% GTL3 + 95% GTL 4
*Base Oil Mix 2 = 10% GTL3 + 90% GTL4
*Base Oil Mix 3 = 5% Yubase 3 + 95% Yubase 4
*Base Oil Mix 4 = 10% Yubase 3 + 90% Yubase 4

Formulations with mixtures of GTL3 and GTL4 as well as with mixtures of Yubase 3 and Yubase 4 as base oils and OLOA 55501 as DI package were prepared by using formulation targets 0W20 according to SAE J300; i.e. it was formulated on a $HTHS_{150}$ target of 2.6 mPas. The resulting additive content was typically between 8.2 to 10.5% by weight. Characteristic engine oil formulation properties ($KV_{40}$, $KV_{100}$, CCS, $HTHS_{100}$, $HTHS_{80}$) were measured and are summarized in Table 8. It was found that changing the base oil composition and the polymer composition in the additive composition by incorporating acrylate units (A8) surprisingly leads to a reduction of Noack evaporation loss by 10.5% (see D1 and D2) with GTL3 and GTL4 as base oil mixture and by 10.8% (see D4 and D5) with Yubase 3 and Yubase 4 as base oil mixture. This way Noack values of 12.8 instead of 14.3% with GTL3 and GTL4 as base oil mixture and Noack values of 14.0 instead of 15.7% with Yubase 3 and Yubase 4 as base oil mixture were obtained. This example demonstrates how Noack levels of engine oil formulations can be reduced below the required levels of 15% by using additive compositions comprising acrylate monomers as described in this patent.

Moreover, the decrease in Noack leads to increased formulation options like the possibility of increasing the amount of low viscous base oils in the formulation. For example, the amount of Yubase 3 or GTL3 in the formulation can be doubled and at the same time the obtained Noack is well below 15% (see D3) or close to 15% (see D7, D8). The latter enables the increase of VI improver amount in the formulation leading to improved performance (e.g. higher VI of the formulation, please compare D2 and D3 or D6 and D8) and therefore better fuel economy is expected. These examples demonstrate how a decreased Noack of the VII indirectly leads to formulation options that would not have been possible otherwise and which result in an improved performance of the engine oil formulation (higher VI).

The invention claimed is:

1. A polyalkyl(meth)acrylate based comb polymer, comprising the following monomers:
   (a) 10 to 25% by weight of at least one ester of (meth) acrylic acid and a hydroxylated hydrogenated polybutadiene;
   (b) 0.5% to 11% by weight of butyl acrylate;
   (c) 0% to 1% by weight of methyl methacrylate;
   (d) 55% to 70% by weight of n-butyl methacrylate;
   (e) 5% to 20% by weight of at least one $C_{10\text{-}15}$ alkyl methacrylate; and
   (f) 0% to 2% by weight of styrene monomers.

2. The polyalkyl(meth)acrylate based comb polymer according to claim 1, comprising as component (b) 0.5 to 5% by weight, of butyl acrylate.

3. The polyalkyl(meth)acrylate based copolymer according to claim 1, having a weight-average molecular weight Mw in the range of 200,000 to 800,000 g/mol, determined by size exclusion chromatography (SEC) using commercially available polymethylmethacrylate standards.

4. The polyalky(meth)acrylate based copolymer according to claim 1, wherein the hydroxylated hydrogenated polybutadiene of component (a) has a number-average molecular weight $M_n$, to DIN 55672-1 of 4,000 to 6,000 g/mol.

5. The polyalkyl(meth)acrylate based copolymer according to claim 1, having a PSSI of not more than 7, calculated according to ASTM D 6022-01 based on data measured according to ASTM D 2603-B.

6. A method of reducing Noack evaporation loss of a lubricating oil composition, the method comprising:
   applying the polyalkyl(meth)acrylate based comb polymer of claim 1 to a lubricating oil composition.

7. An additive composition, comprising:
   (A) 60 to 80% by weight of a base oil, and
   (B) 20 to 40% by weight of a polyalkyl(meth)acrylate based comb polymer, comprising the following monomers:
   (a) 10 to 25% by weight of at least one ester of (meth)acrylic acid and a hydroxylated hydrogenated polybutadiene;
   (b) 0.5% to 11% by weight of butyl actylate;
   (c) 0% to 1% by weight of methyl methacrylate;
   (d) 55% to 70% by weight of n-butyl methacrylate;
   (e) 5% to 20% by weight of at least one $C_{10\text{-}15}$ alkyl methacrylate; and
   (f) 0% to 2% by weight of at least one styrene monomer.

8. The additive composition according to claim 7, having a VI of at least 245.

9. The additive composition according to claim 7, wherein component (A) is present in an amount of 70 to 75% by weight and component (B) is present in an amount of 25 to 30% by weight.

10. The additive composition according to claim 7, wherein component (A) comprises:
   (A1) 54 to 80% by weight of at least one base oil selected from the group consisting of API Group I oils, Group II oils, Group III oils, Group IV oils and any mixture thereof, and
   (A2) 0 to 6% by weight of at least one API Group V oil, based on the total weight of the additive composition.

11. A method of reducing Noack evaporation loss of a lubricating oil composition, the method comprising:
   applying the additive composition of claim 7 to a lubricating oil composition.

12. A lubricating oil composition, comprising:
   (A) 75 to 98% by weight of a base oil;
   (B) 2 to 10% by weight of a polyalkyl(meth)aerylate based comb polymer, comprising the following monomers:
   (a) 10 to 25% by weight of at least one ester of (meth)acrylic acid and a hydroxylated hydrogenated polybutadiene;
   (b) 0.5% to 11% by weight of butyl acrylate;
   (c) 0% to 1% by weight of methyl methacrylate;
   (d) 55% to 70% by weight of n-butyl methacrylate;
   (e) 5% to 20% by weight of at least one $C_{10\text{-}15}$ alkyl methacrylate;
   (f) 0% to 2% by weight of at least one styrene monomer; and
   (C) 0 to 15% by weight of one or more further additives.

13. The lubricating oil composition according to claim 12, wherein component (A) comprises:
   (A1) 74.25 to 97.95% by weight of at least one base oil selected from the group consisting of API Group I oils, Group II oils, Group III oils, Group IV oils and any mixture thereof, and
   (A2) 0.05 to 0.75% by weight of at least one API Group V oil, based on the total weight of the lubricating oil composition.

14. The lubricating oil composition according to claim 12, wherein component (C) is at least one selected from the group consisting of conventional VI improvers, dispersants, defoamers, detergents, antioxidants, pour point depressants, antiwear additives, extreme pressure additives, friction modifiers, anticorrosion additives, dyes and any mixtures thereof.

15. The polyalkyl(meth)acrylate based copolymer according to claim 1, having a weight-average molecular weight $M_w$, in the range of 300,000 to 600,000 g/mol, determined by size exclusion chromatography (SEC) using commercially available polymethylmethacrylate standards.

16. The polyalkyl(meth)acrylate based copolymer according to claim 1, having a PSSI of below 3, calculated according to ASTM D 6022-01 based on data measured according to ASTM D 2603-B.

17. The additive composition according to claim 10, wherein component (A2) comprises dioctylsebacate (DIOS).

18. The lubricating oil composition according to claim 12, wherein the concentration of component (B) is in the range of 2 to 5% by weight, based on the total weight of the lubricating oil composition.

19. The lubricating oil composition according to claim 12, comprising:
   (A) 80 to 98% by weight of a base oil;
   (B) 2 to 10% by weight of a polyalkyl(meth)acrylate based comb polymer, comprising the following monomers:
      (a) 10 to 25% by weight of at least one ester of (meth)acrylic acid and a hydroxylated hydrogenated polybutadiene;
      (b) 0.5% to 11% by weight of butyl acrylate;
      (c) 0% to 1% by weight of methyl methacrylate;
      (d) 55% to 70% by weight of n-butyl methacrylate;
      (e) 5% to 20% by weight of at least one $C_{10-15}$ alkyl methacrylate;
      (f) 0% to 2% by weight of at least one styrene monomer; and
   (C) 0 to 15% by weight of one or more further additives.

* * * * *